(12) United States Patent
Arnone

(10) Patent No.: US 9,881,451 B2
(45) Date of Patent: *Jan. 30, 2018

(54) GAMBLING HYBRID GAMING SYSTEM WITH ACCUMULATED TRIGGER AND DEFERRED GAMBLING

(71) Applicant: Gamblit Gaming, LLC, Glendale, CA (US)

(72) Inventor: Miles Arnone, Sherborn, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/797,016

(22) Filed: Jul. 10, 2015

(65) Prior Publication Data
US 2015/0317874 A1   Nov. 5, 2015

Related U.S. Application Data

(63) Continuation of application No. PCT/US2013/071746, filed on Nov. 25, 2013.

(60) Provisional application No. 61/751,001, filed on Jan. 10, 2013.

(51) Int. Cl.
*G07F 17/32* (2006.01)
*G06F 21/55* (2013.01)

(52) U.S. Cl.
CPC ...... *G07F 17/3237* (2013.01); *G07F 17/3244* (2013.01); *G07F 17/3262* (2013.01); *G07F 17/3269* (2013.01); *G07F 17/3295* (2013.01); *G06F 21/552* (2013.01); *G07F 17/32* (2013.01); *G07F 17/3241* (2013.01)

(58) Field of Classification Search
CPC ............ G07F 17/3241; G07F 17/3295; G07F 17/552; G07F 17/3244; G07F 17/3269; G07F 17/3292

See application file for complete search history.

(56) References Cited

U.S. PATENT DOCUMENTS

| 5,413,357 | A | 5/1995 | Schulze et al. |
| 5,718,429 | A | 2/1998 | Keller |
| 5,785,592 | A | 7/1998 | Jacobsen |
| 5,853,324 | A | 12/1998 | Kami et al. |
| 5,963,745 | A | 10/1999 | Collins et al. |

(Continued)

OTHER PUBLICATIONS

U.S. Appl. No. 14/185,847, Arnone, et al., filed Feb. 20, 2014.

(Continued)

*Primary Examiner* — William H McCulloch, Jr.
(74) *Attorney, Agent, or Firm* — Caitlyn Ross

(57) ABSTRACT

Systems and methods for providing a gambling hybrid game with an accumulated trigger and deferred gambling are disclosed. The gambling hybrid game monitors an accumulation of an activating element during play of an entertainment game and activates a gambling game in a manner dependent upon the amount of the activating element accumulated during the play of the entertainment game. The gambling game may occur only after a sufficient amount of the activating element has been accumulated and/or at a particular point in game play of the entertainment game. Awards of a game currency and/or real credits based on the results of gambling events in the gambling game may also be determined by the accumulation of the activating element.

21 Claims, 17 Drawing Sheets

(56) References Cited

U.S. PATENT DOCUMENTS

| | | |
|---|---|---|
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,938,727 B1 | 5/2011 | Konkle |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,308,544 B2 | 11/2012 | Friedman |
| 8,475,266 B2 | 7/2013 | Arnone |
| 8,480,470 B2 | 7/2013 | Napolitano et al. |
| 8,622,809 B1 | 1/2014 | Arora et al. |
| 9,384,623 B2 * | 7/2016 | Arnone .................. G07F 17/32 |
| 9,483,165 B2 * | 11/2016 | Arnone .................. G07F 17/32 |
| 2001/0004609 A1 | 6/2001 | Walker et al. |
| 2001/0019965 A1 | 9/2001 | Ochi |
| 2002/0022509 A1 | 2/2002 | Nicastro et al. |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0097610 A1 | 5/2004 | Saito |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0142108 A1 | 6/2007 | Linard |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |

(56) References Cited

U.S. PATENT DOCUMENTS

| | | |
|---|---|---|
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275393 A1 | 11/2009 | Kisenwether |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |
| 2013/0260869 A1 | 10/2013 | Leandro et al. |
| 2014/0087801 A1 | 3/2014 | Nicely et al. |
| 2014/0087808 A1 | 3/2014 | Leandro et al. |
| 2014/0087809 A1 | 3/2014 | Leupp et al. |

OTHER PUBLICATIONS

U.S. Appl. No. 14/203,459, Arnone, et al., filed Mar. 10, 2014.
U.S. Appl. No. 14/205,272, Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986, Arnone, et al., filed Feb. 7, 2014.
U.S. Appl. No. 14/176,014, Arnone, et al., filed Feb. 7, 2014.
U.S. Appl. No. 14/179,487, Arnone, et al., filed Feb. 12, 2014.
U.S. Appl. No. 14/179,492, Arnone, et al., filed Feb. 12, 2014.
U.S. Appl. No. 14/181,190, Arnone, et al., filed Feb. 14, 2014.
U.S. Appl. No. 14/186,393, Arnone, et al., filed Feb. 21, 2014.
U.S. Appl. No. 14/188,587, Arnone, et al., filed Feb. 24, 2014.
U.S. Appl. No. 14/205,303, Arnone, et al., filed Mar. 11, 2014.
U.S. Appl. No. 14/205,306, Arnone, et al., filed Mar. 11, 2014.
U.S. Appl. No. 14/209,485, Arnone, et al., filed Mar. 13, 2014.
U.S. Appl. No. 14/214,310, Arnone, et al., filed Mar. 14, 2014.
U.S. Appl. No. 14/222,520, Arnone, et al., filed Mar. 21, 2014.
U.S. Appl. No. 14/253,813, Arnone, et al., filed Apr. 15, 2014.
U.S. Appl. No. 14/255,253, Arnone, et al., filed Apr. 17, 2014.
U.S. Appl. No. 14/255,919, Arnone, et al., filed Apr. 17, 2014.
U.S. Appl. No. 14/263,988, Arnone, et al., filed Apr. 28, 2014.
U.S. Appl. No. 14/270,335, Arnone, et al., filed May 5, 2014.
U.S. Appl. No. 14/271,360, Arnone, et al., filed May 6, 2014.
U.S. Appl. No. 13/961,849, Arnone, et al., filed Aug. 7, 2013.
U.S. Appl. No. 13/746,850, Arnone, et al., filed Jan. 22, 2013.
U.S. Appl. No. 14/288,169, Arnone, et al., filed May 27, 2014.
U.S. Appl. No. 14/304,027, Arnone, et al., filed Jun. 13, 2014.
U.S. Appl. No. 14/306,187, Arnone, et al., filed Jun. 16, 2014.

(56) References Cited

OTHER PUBLICATIONS

U.S. Appl. No. 14/312,623, Arnone, et al., filed Jun. 23, 2014.
U.S. Appl. No. 14/330,249, Arnone, et al., filed Jul. 14, 2014.
U.S. Appl. No. 14/339,142, Arnone, et al., filed Jul. 23, 2014.
U.S. Appl. No. 14/458,206, Arnone, et al., filed Aug. 12, 2014.
U.S. Appl. No. 14/461,344, Arnone, et al., filed Aug. 15, 2014.
U.S. Appl. No. 14/462,516, Arnone, et al., filed Aug. 18, 2014.
U.S. Appl. No. 14/467,646, Meyerhofer, et al., filed Aug. 25, 2014.
U.S. Appl. No. 14/474,023, Arnone, et al., filed Aug. 29, 2014.
U.S. Appl. No. 14/486,895, Arnone, et al., filed Sep. 15, 2014.
U.S. Appl. No. 14/507,206, Arnone, et al., filed Oct. 6, 2014.
U.S. Appl. No. 14/521,338, Arnone, et al., filed Oct. 22, 2014.
U.S. Appl. No. 14/535,808, Arnone, et al., filed Nov. 7, 2014.
U.S. Appl. No. 14/535,816, Arnone, et al., filed Nov. 7, 2014.
U.S. Appl. No. 14/536,231, Arnone, et al., filed Nov. 7, 2014.
U.S. Appl. No. 14/536,280, Arnone, et al., filed Nov. 7, 2014.
U.S. Appl. No. 14/549,137, Arnone, et al., filed Nov. 20, 2014.
U.S. Appl. No. 14/550,802, Arnone, et al., filed Nov. 21, 2014.
U.S. Appl. No. 14/555,401, Arnone, et al., filed Nov. 26, 2014.
U.S. Appl. No. 14/559,840, Arnone, et al., filed Dec. 3, 2014.
U.S. Appl. No. 14/564,834, Arnone, et al., filed Dec. 9, 2014.
U.S. Appl. No. 14/570,746, Arnone, et al., filed Dec. 15, 2014.
U.S. Appl. No. 14/570,857, Arnone, et al., filed Dec. 15, 2014.
U.S. Appl. No. 14/586,626, Arnone, et al., filed Dec. 30, 2014.
U.S. Appl. No. 14/586,639, Arnone, et al., filed Dec. 30, 2014.
WIPO—ISA, International Search Report and Written Opinion, PCT/US13/71746, dated Apr. 18, 2014.
U.S. Appl. No. 14/586,645, Arnone, et al., filed Dec. 30, 2014.
U.S. Appl. No. 14/598,151, Arnone, et al., filed Jan. 15, 2015.
U.S. Appl. No. 14/601,063, Arnone, et al., filed Jan. 20, 2015.
U.S. Appl. No. 14/601,108, Arnone, et al., filed Jan. 20, 2015.
U.S. Appl. No. 14/608,000, Arnone, et al., filed Jan. 28, 2015.
U.S. Appl. No. 14/608,087, Arnone, et al., filed Jan. 28, 2015.
U.S. Appl. No. 14/608,093, Arnone, et al., filed Jan. 28, 2015.
U.S. Appl. No. 14/610,897, Arnone, et al., filed Jan. 30, 2015.
U.S. Appl. No. 14/611,077, Arnone, et al., filed Jan. 30, 2015.
U.S. Appl. No. 14/604,629, Arnone, et al., filed Jan. 23, 2015.
U.S. Appl. No. 14/625,475, Arnone, et al., filed Feb. 18, 2015.
U.S. Appl. No. 14/617,852, Arnone, et al., filed Feb. 9, 2015.
U.S. Appl. No. 14/627,428, Arnone, et al., filed Feb. 20, 2015.
U.S. Appl. No. 14/642,427, Arnone, et al., filed Mar. 9, 2015.
U.S. Appl. No. 14/665,991, Arnone, et al., filed Mar. 23, 2015.
U.S. Appl. No. 14/666,010, Arnone, et al., filed Mar. 23, 2015.
U.S. Appl. No. 14/666,022, Arnone, et al., filed Mar. 23, 2015.
U.S. Appl. No. 14/642,623, Arnone, et al., filed Mar. 9, 2015.
U.S. Appl. No. 14/663,337, Arnone, et al., filed Mar. 19, 2015.
U.S. Appl. No. 14/666,284, Arnone, et al., filed Mar. 23, 2015.
U.S. Appl. No. 14/679,885, Arnone, et al., filed Apr. 6, 2015.
U.S. Appl. No. 14/685,378, Arnone, et al., filed Apr. 13, 2015.
U.S. Appl. No. 14/686,675, Arnone, et al., filed Apr. 14, 2015.
U.S. Appl. No. 14/686,678, Arnone, et al., filed Apr. 14, 2015.
U.S. Appl. No. 14/701,430, Arnone, et al., filed Apr. 30, 2015.
U.S. Appl. No. 14/703,721, Arnone, et al., filed May 4, 2015.
U.S. Appl. No. 14/708,138, Arnone, et al., filed May 8, 2015.
U.S. Appl. No. 14/708,141, Arnone, et al., filed May 8, 2015.
U.S. Appl. No. 14/708,160, Arnone, et al., filed May 8, 2015.
U.S. Appl. No. 14/708,161, Arnone, et al., filed May 8, 2015.
U.S. Appl. No. 14/708,162, Arnone, et al., filed May 8, 2015.
U.S. Appl. No. 14/710,483, Arnone, et al., filed May 12, 2015.
U.S. Appl. No. 14/714,084, Arnone, et al., filed May 15, 2015.
U.S. Appl. No. 14/715,463, Arnone, et al., filed May 18, 2015.
U.S. Appl. No. 14/720,620, Arnone, et al., filed May 22, 2015.
U.S. Appl. No. 14/720,624, Arnone, et al., filed May 22, 2015.
U.S. Appl. No. 14/720,626, Arnone, et al., filed May 22, 2015.
U.S. Appl. No. 14/727,726, Arnone, et al., filed Jun. 1, 2015.
U.S. Appl. No. 14/730,183, Arnone, et al., filed Jun. 3, 2015.
U.S. Appl. No. 14/731,321, Arnone, et al., filed Jun. 4, 2015.
U.S. Appl. No. 14/740,078, Arnone, et al., filed Jun. 15, 2015.
U.S. Appl. No. 14/742,517, Arnone, et al., filed Jun. 17, 2015.
U.S. Appl. No. 14/743,708, Arnone, et al., filed Jun. 18, 2015.
U.S. Appl. No. 14/746,731, Arnone, et al., filed Jun. 22, 2015.
U.S. Appl. No. 14/748,122, Arnone, et al., filed Jun. 23, 2015.
U.S. Appl. No. 14/788,581, Arnone, et al., filed Jun. 30, 2015.

* cited by examiner

GAMBLING HYBRID GAMING SYSTEM WITH ACCUMULATED TRIGGER AND DEFERRED GAMBLING

CROSS-REFERENCE TO RELATED APPLICATIONS

This application is a continuation of Patent Cooperation Treaty Application No. PCT/US13/71746, filed Nov. 25, 2013 which claims the benefit of U.S. Provisional Application No. 61/751,001, filed Jan. 10, 2013, the disclosures of which are incorporated herein by reference as if set forth herewith.

FIELD OF THE INVENTION

Embodiments of the present invention are generally related to gaming and more specifically to systems and processes that provide gambling events to a user for a gambling hybrid game.

BACKGROUND OF THE INVENTION

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC.

SUMMARY OF THE INVENTION

Systems and methods in accordance with embodiments of the invention provide a gambling hybrid game system that provides delayed gambling based upon an accumulated trigger in an entertainment game. In accordance with embodiments of the invention, the gambling hybrid game system includes a controller constructed to execute the entertainment game and present the entertainment game to a player. The controller is constructed to maintain a record of an amount of an activating element accumulated during play of the entertainment game, and generate a status update regarding play of the entertainment game over a specific period where the status update includes information about the amount of the activating element accumulated over the specific period. The controller is further constructed to communicate, to a game world server, the status update regarding play of the entertainment game over the specific period where the status update includes information about the amount of the activating element accumulated over the specific period, receive, from the game world server, a result of a gambling event, and present the result of the gambling event to the player. In accordance with embodiments of the invention, the gambling hybrid game system includes a real world server constructed to receive, from the game world server, instructions to execute the gambling event based on the status update upon the amount of the activating element accumulated over the specific period, determine the result of the gambling event in a gambling game and to resolve a wager of credits on an outcome of the gambling event and communicate, to the game world server, the result of the gambling event. In accordance with embodiments of the invention, the gambling hybrid game system includes a game world server, connected to the controller via a controller and connected to the real world server via a communication link, where the game world server is constructed to manage the entertainment game executed by the controller and receive, from the controller, the status update about the entertainment game that includes the amount of the activating element accumulated over the specific period. The game world server is further constructed to determine a gambling event in the gambling game is to occur based upon the amount of the activating element accumulated over the specific period, communicate, to the real world server, instructions to execute the gambling event based on a determination of whether to execute the gambling event based upon the amount of the activating element accumulated over the specific period, receive, from the real world server, the result of the gambling event, and communicate, to the controller, the result of the gambling event.

In many embodiments, the game world server is constructed further to determine the amount of Quanta available to the player based on the result of the gambling event wherein Quanta is a currency that may be exchanged to change an entertainment game characteristic.

In various embodiments, the game world server is further constructed to provide the entertainment game characteristic that the player may change by expending a particular amount of the Quanta, receive a request from the player to change the entertainment game characteristic, deduct the particular amount of Quanta from the amount available to the player, and provide update information to the controller including the change in the game characteristic for use in the entertainment game.

In many embodiments, the game world server is constructed to determine a pay table for the gambling game based on a total accumulation of activating elements during game play and provide the pay table to the real world server for use in determining the results of the gambling event.

In various embodiments, the game world server is constructed to determine the amount of real world credit to be wagered on the gambling event in the gambling game based on an accumulation of activating elements during the specific period and provide the wager amount to the real world server.

In numerous embodiments, the game world server is further constructed to select one of plurality of gambling games to be used for the gambling event based upon the activating elements accumulated and indicate to the real world server that the selected gambling game is to be used for the gambling event.

In many embodiments, the communications link is the communications network.

DETAILED DISCLOSURE OF THE INVENTION

Turning now to the drawings, systems and methods for providing a gambling hybrid game with an accumulated trigger and deferred gambling are disclosed. In many gambling hybrid games, an event in a provided entertainment game, such as but not limited to, the consumption of an Enabling Element (EE) or the occurrence of an Actionable Element (AE) immediately causes a gambling event in a gambling game to be initiated. Further, the result of the gambling event or events in the gambling game provides feedback to the entertainment game in some form including, but not limited to, the awarding of virtual credits or replenishment of an EE.

Gambling hybrid games in accordance with many embodiments of this invention involve a player collecting, scoring, or undertaking actions that lead to the accumulation of some activating element including, but not limited to, EEs, AEs, Common Enabling Elements (CEE), or the like while playing the entertainment game. At an appropriate point subsequent to the accumulation during play of the entertainment game, one or more gambling games are actuated as a function of the amount of the activating element accumulated and/or the amount of Real Credit (RC) committed to the gambling game by the player.

Gambling Hybrid Games

Figure 1:
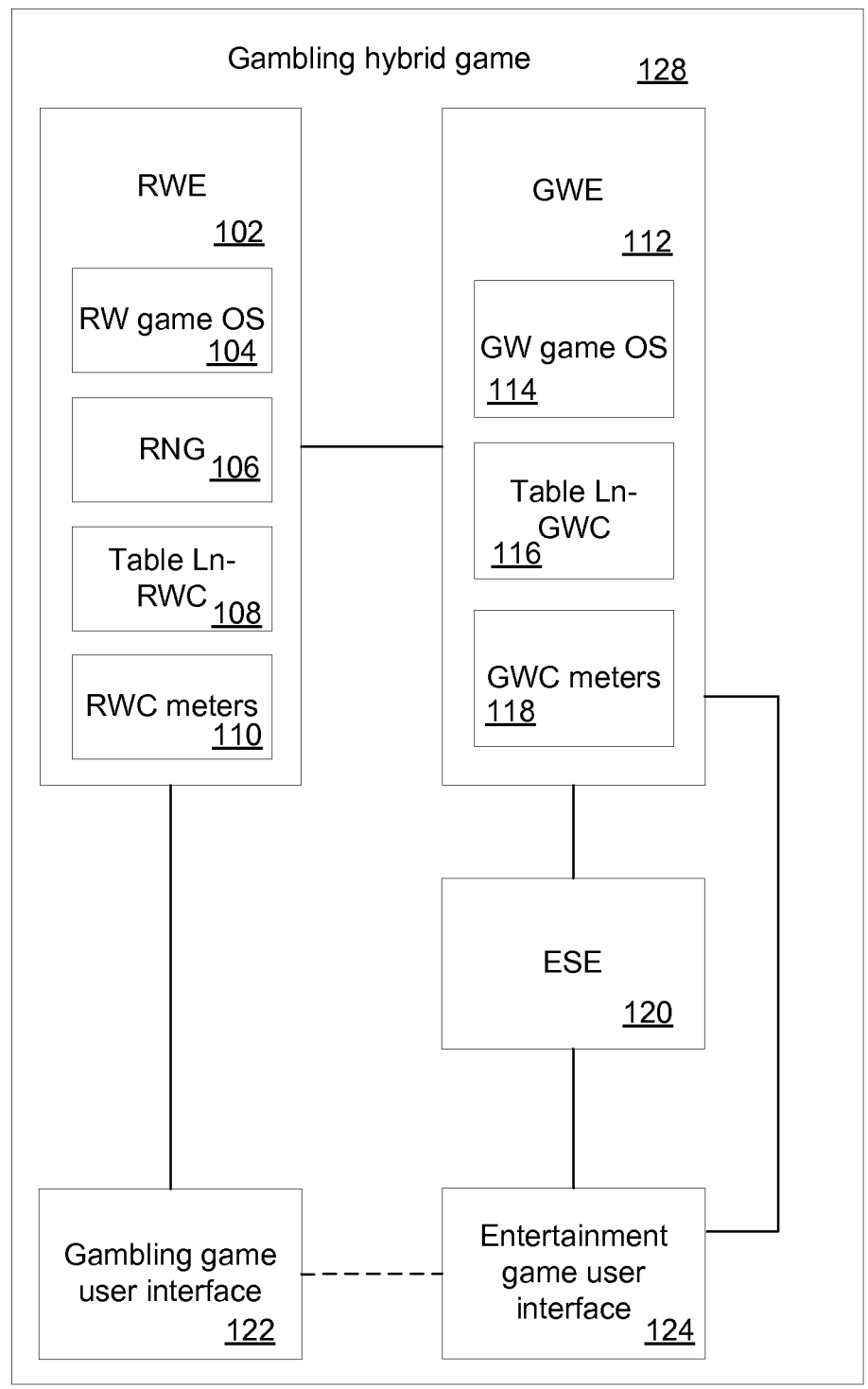
FIG. 1 illustrates a conceptual diagram of components of a gambling hybrid game in accordance with an embodiment of the invention.

In accordance with many embodiments of this invention, a gambling hybrid game integrates high-levels of entertainment content with a game of skill (entertainment game) and a gambling experience with a game of chance (gambling game). A gambling hybrid game provides for random outcomes independent of player skill while providing that the user's gaming experience (as measured by obstacles/challenges encountered, time of play and other factors) is shaped by the player's skill. The outcome of a gambling proposition that is determined by a Random Number Generator (RNG) or other such device that provides a random outcome in response to a request. In accordance with some embodiments, the wager game may be initiated in response to a game object related player action. A gambling hybrid game in accordance with an embodiment of the invention is illustrated in FIG. 1. The gambling hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE includes a Real World (RW) operating system (OS) 104, RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (Table Ln-RC) 108 is a table that can be used in conjunction with a Random Number Generator (RNG) 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a random number generator according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game level n need not be the same for each level.

In accordance with some embodiments of this invention, the GWE 112 manages the overall gambling hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an Operating System (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a RNG. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of this invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a Personal Computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a draw certificate based gambling hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a gambling hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the gambling hybrid game can leverage very popular titles with gamers and provides a sea change environment for casinos to attract players with games that are more akin to the type of entertainment that a younger generation desires. In accordance with various embodiments, players can use their skill towards building and banking Game World Credit (GWC) that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, gambling hybrid games also allow players to gain entry into subsequent competitions through the accumulation of Game World Credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The gambling hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
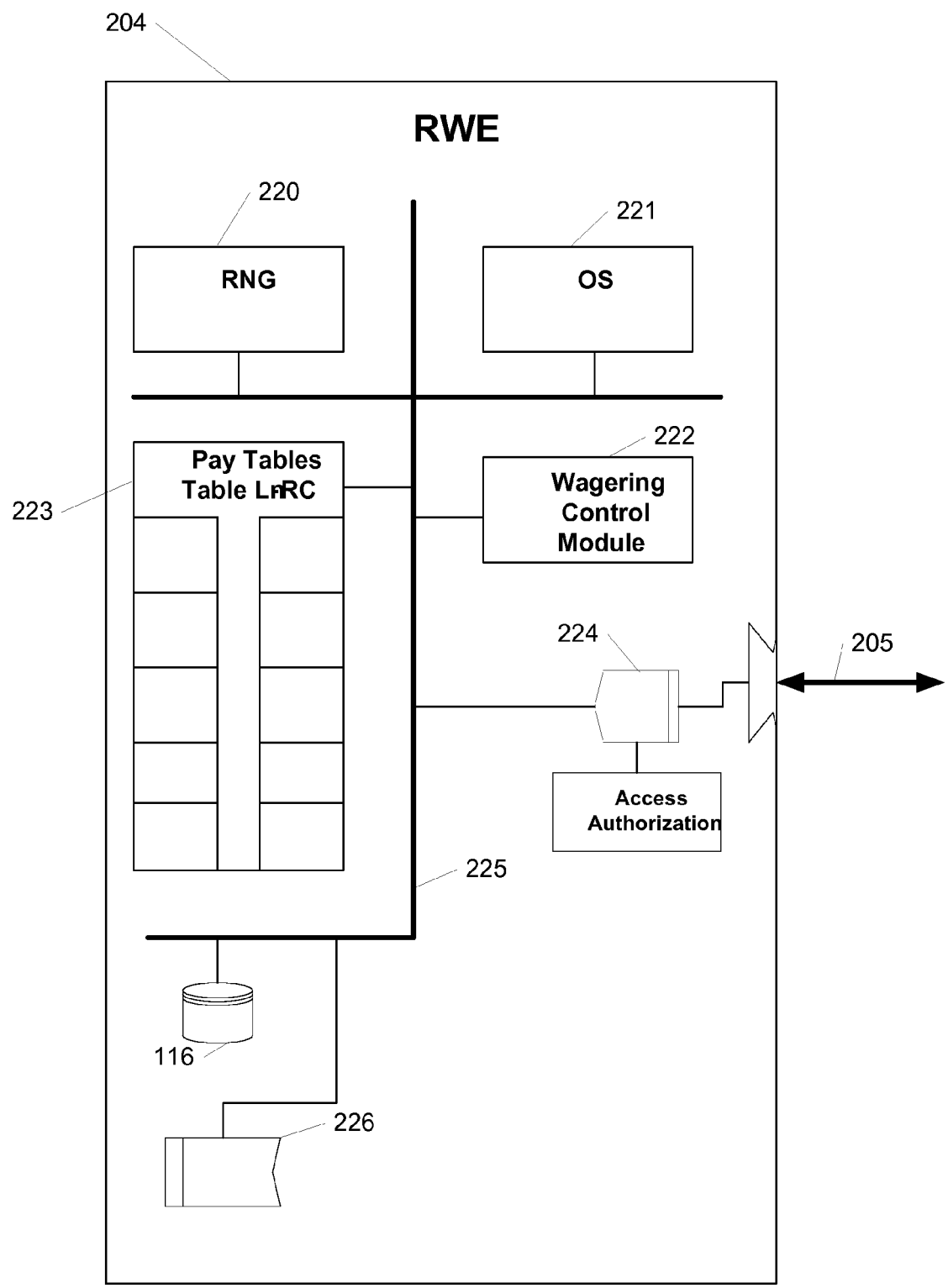
FIG. 2 illustrates a conceptual diagram of aspects of a Real World Engine (RWE) of a gambling hybrid game in accordance with some embodiments of the invention.

The components provided by the RWE for a gambling hybrid game in accordance with embodiments of the invention are shown in FIG. 2. In accordance with embodiments of the invention, the RWE includes an internal bus 225 that connects an operating system OS 221, a Random Number Generator ("RNG") 220, one or more pay tables (Table Ln-RC) 223 which would control the functions of the RWE, a Random Number Generator ("RNG") 220 to produce random numbers, one or more pay tables (Table Ln-RC) 223, a wagering control module 222, an authorization access module 224, and a RC credit meter 226 that are included in the RWE 204. The RW OS 221 controls the functions of the RWE. The RNG 220 includes one or more RNGs that are used to produce random numbers for use in resolving gambling events and other process requiring a random number to determine an outcome. The one or more pay tables (Table Ln-RC) 223 contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 926 maintains a record of the amount of RC which player has deposited in the game and has been accumulated by the player.

An external connection allows the RWE 204 to interface to another system or device, which is shown in FIG. 2 as the internet 205 but may be any other network and/or device. The authorization access module 224 of RWE 204 is connected to the external connection and provides a method to permit access and command exchange between an external system and the RWE 204. The RWE 204 also contains storage for statuses, wagers, wager outcomes, meters and other historical events in a storage device 116.

Figure 3:
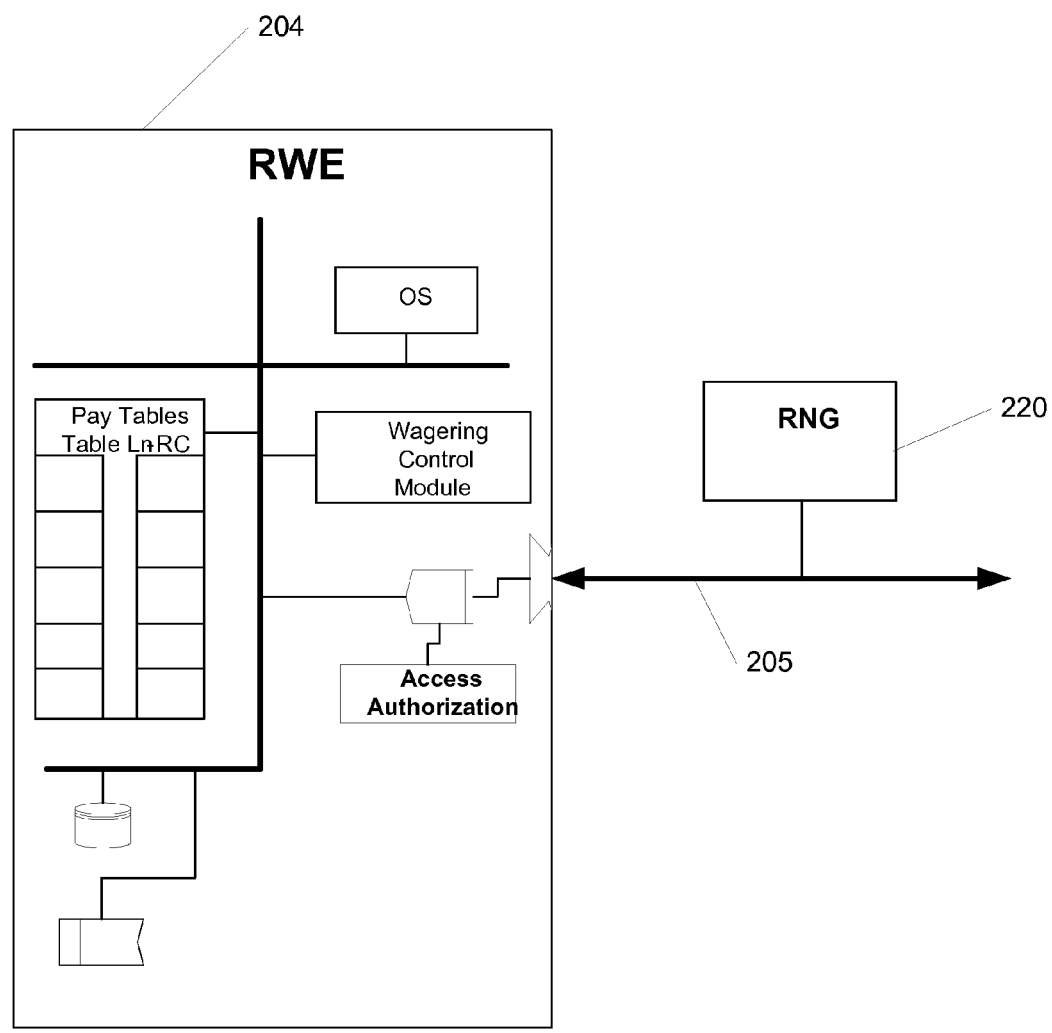
FIG. 3 illustrates a conceptual diagram of aspects of a Real World Engine of a gambling hybrid game in accordance with some other embodiments of the invention.

In some embodiments, the RWE communicates with external systems to provide various functions of a gambling hybrid game in accordance with embodiments of the invention. The components of an RWE that communicate with an external system to provide a component of the RWE in accordance with embodiments of the invention are shown in FIG. 3. The RWE 204 shown in FIG. 3 is similar to the RWE shown in FIG. 2. However, the RNG 220 which is an external system connected to the RWE 204 by the internet 905 in accordance with embodiments of the invention. The RNG 220 could be a central deterministic system, such as a regulated and controlled random numbered ball selection device, or some other system which provides random or pseudo random numbers to one or a plurality of connected RWEs 204. One skilled in the art will recognize that only RNG 220 is an external system in the shown embodiments. However, any of the components could be external systems without departing from the invention and RNG 220 is shown as an example only.

In FIGS. 2 and 3, the RWE 204 interfaces with other systems/devices or to an external RNG 220 using the Internet 205. However, one skilled in the art will note that nothing would preclude using a different interface than the internet 205 in other embodiments of the invention. Other examples of interfaces include, but are not limited to, a LAN, a USB interface, or some other method by which two electronic and software constructs could communicate with each other.

Figure 4:
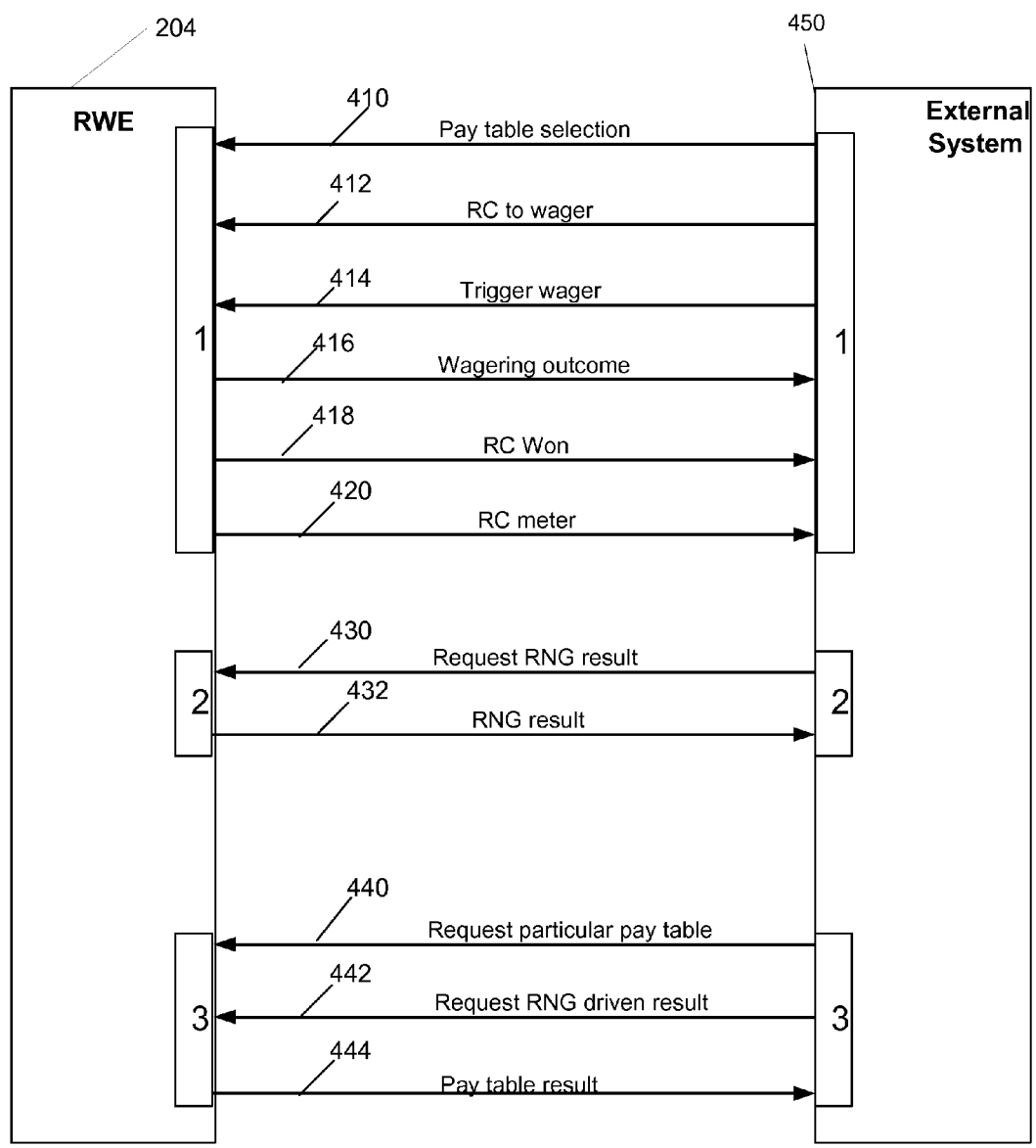
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during a gambling hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an RNG result support from the RWE 204. In this exchange, the external system 450 requests an RNG result from the RWE 204 (430). The RWE 204 returns an RNG result to the external 450 in response to the request (432). The result may be generated as a function of the internal RNG in the RWE 204, or from an RNG external to the RWE 204 to which the RWE 204 is connected.

A third communication exchange between the RWE 204 and the external system 405 in accordance with embodiments of the invention that is shown in FIG. 4 is grouped by the "3" box in the figure and relates to the external system 450 wanting support on coupling an RNG result to a particular Pay Table contained in the RWE 204. In this exchange, the external system 450 instructs the RWE as to the pay table (Table Ln-RC) to use 450 (440). The external system then requests a result whereby the RNG result is coupled to the requested Pay Table (442). The result is returned to the external system 405 by RWE 204 (444). Such an aspect is different from the first exchange shown by the box "1" sequence in that no actual RC wager is conducted. However, such a process might be useful in coupling certain non-RC wagering entertainment game behaviors and propositions to the same final resultant wagering return which is understood for the gambling hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
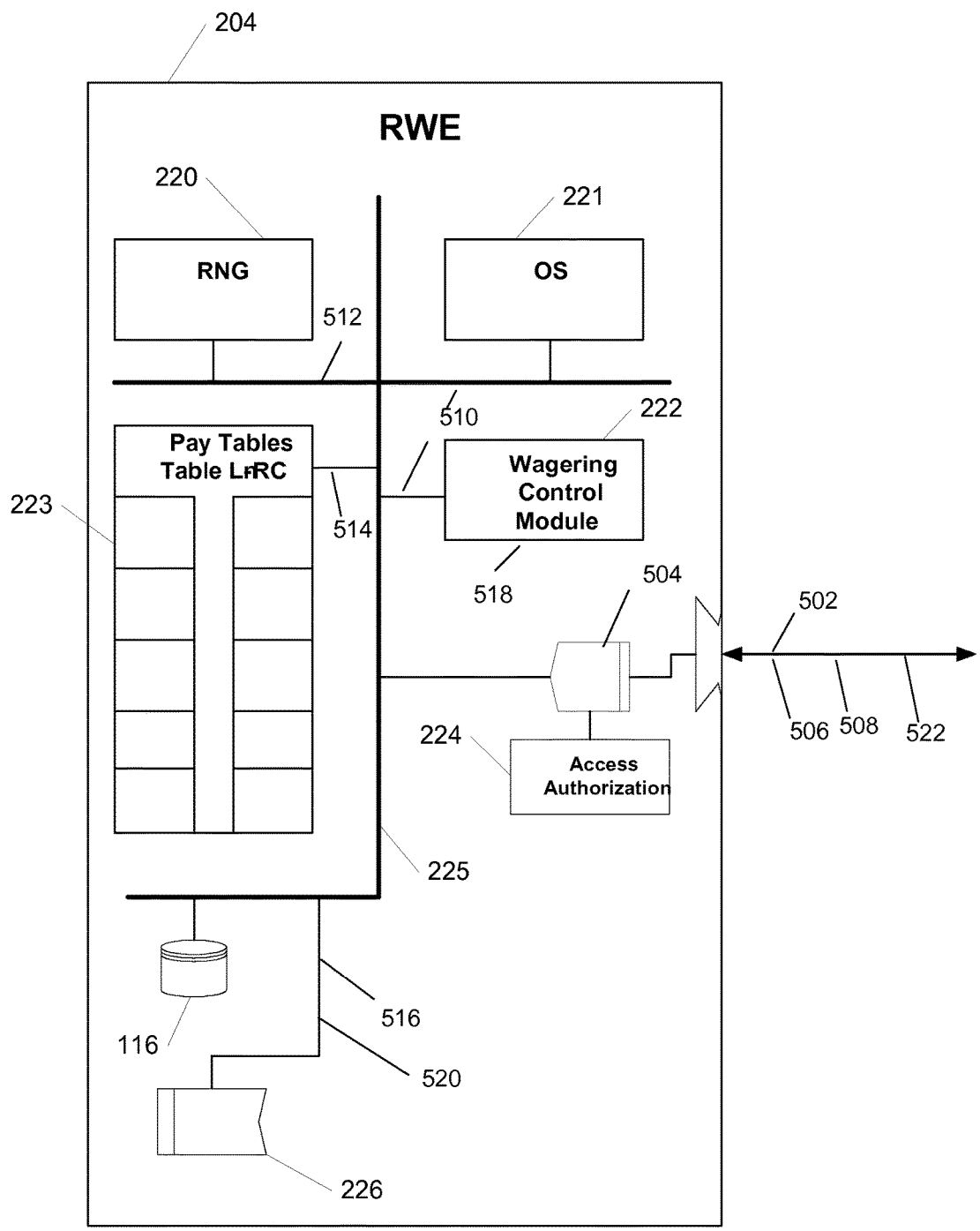
FIG. 5 illustrates a conceptual diagram of a process flow and signaling in a Real World Engine to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204 (502). The Access Authorization Module determines that the external system authorized to connect to RWE 204 (504) and transmits an authorization response to the external system. The external systems that made the request to connect then signals a request for a gambling event is to be performed to RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execute (510). In response to the request to execute the gambling event, the wager control module 222 requests an RNG result from the RNG 220 (512); retrieves a proper pay table or tables from the pay tables 223 (514); adjusts the RC of the player in the RC repository 226 as instructed (516); applies the RNG result to the particular pay table or tables (518); and multiplies the resultant factor from the Pay Table by the amount of RC to determine the result of the wager (518). Wager Control Module 222 then adds the amount of RC won by the wager to the RC repository 426 (520); and provides he outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
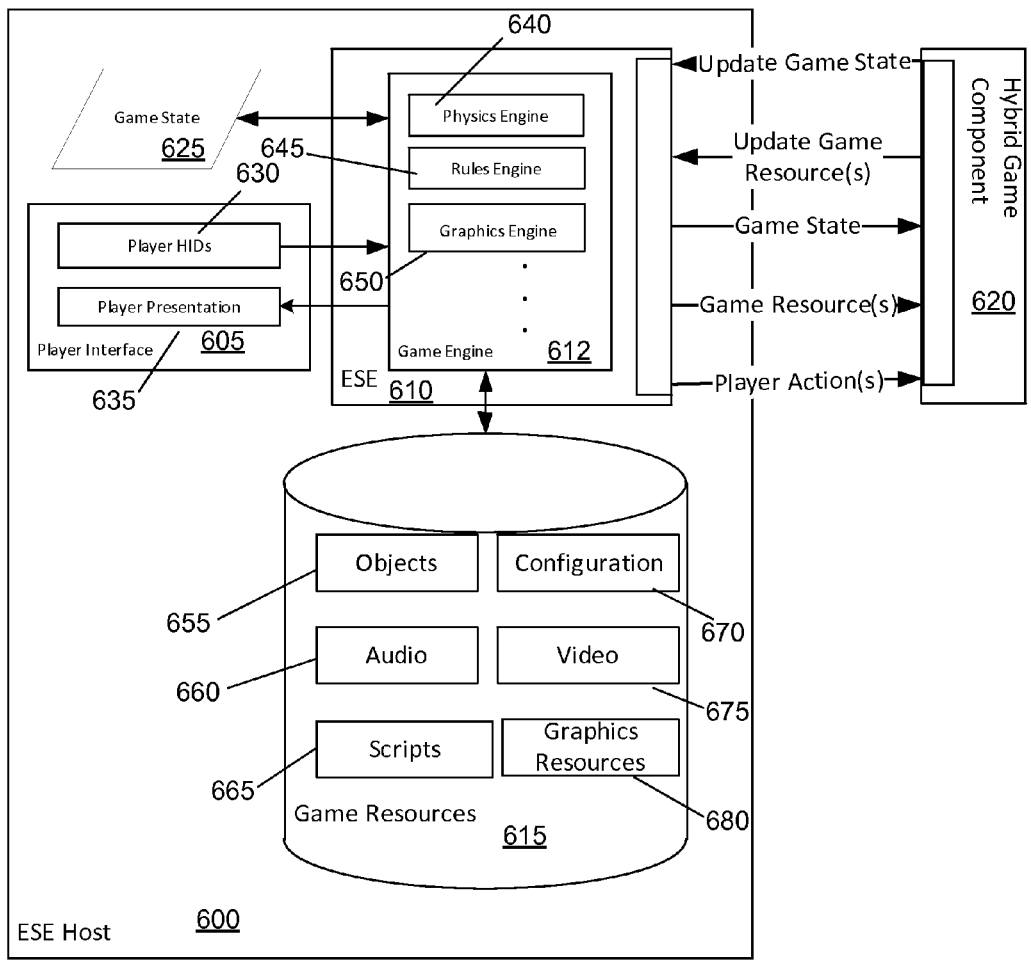
FIG. 6 illustrates a conceptual diagram of aspects of an Entertainment System Engine in accordance with embodiments of the invention.

A block diagram of components an ESE being provided by an ESE host for a gambling hybrid game in accordance with embodiments of the invention are shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, an RNG that may be used for influencing or determining certain variables and/or outcomes to provide a randomizing influence on game play, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various game play features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process loops in a game loop continuously while the player plays the game.

In some embodiments, the ESE is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of a gambling hybrid game, such as a GWE. The ESE 610 and the other gambling hybrid game component 620 communicate with each other using the interfaces, such as by passing various types of data and sending and receiving messages, status information, commands and the like. Examples of communications include, but are not limited to, requesting by the gambling hybrid game component 620 that the ESE 610 update the game state using information provided by the other component; requesting, by the gambling hybrid game component 620, that the ESE 610 update one or more game resources using information provided by the gambling hybrid game component 620; the ESE 610 providing all or a portion of the game state; the ESE 610 providing one or more of the game resources to the gambling hybrid game component 620; and the ESE 610 communicating player actions to the other gambling hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue Game World Credits (GWC) within the entertainment game. These credits can be in the form of (but are not limited to) game world credits, experience points, or points generally. Wagers can be made in the gambling game as triggered by the player's use of one or more elements of the entertainment game. The wagers are made using Real world Credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include Enabling Elements (EE) which are elements that enable a player's play of the entertainment game and whose consumption by the player while playing the entertainment game can trigger a wager in a gambling game. Another non limiting example of an element is a Reserve Enabling Element (REE), which is an element that converts into one or more enabling elements upon occurrence of a release event in skill wagering interleaved game gameplay. Other types of elements include Actionable Elements (AE) which are elements that are acted upon to trigger a wager in the gambling game and may or may not be restorable during normal play of the entertainment game. Another type of element is a Common Enabling Element (CEE) which as an element that may be shared by two or more players and the use of which by any of the players causes a wager to be triggered.

In progressing through entertainment game gameplay, elements can be utilized by a player during interactions with a Controlled Entity (CE) which is a character, entity, inanimate object, device or other object under control of a player.

Also, entertainment game gameplay progress and wager triggers can be dependent upon a game world variable such as, but not limited to: a Required Game Object (RGO) which is a specific game object in an entertainment game acted upon for an AE to be completed (such as but not limited to a specific key needed to open a door); a Required Environmental Condition (REC) which is a game state present within an entertainment game for an AE to be completed (such as but not limited to daylight whose presence enables a character to walk through woods); or a Controlled Entity Characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos. PCT/US11/26768, filed Mar. 1, 2011, PCT/US11/63587, filed Dec. 6, 2011, PCT/US12/32652 filed Apr. 7, 2012, PCT/US12/40548 filed Jun. 1, 2012, USPCT/US12/40800 filed Jun. 4, 2012, and PCT/US12/50204 filed Aug. 9, 2012, each disclosure of which is hereby incorporated by reference in its entirety.

Figure 7:
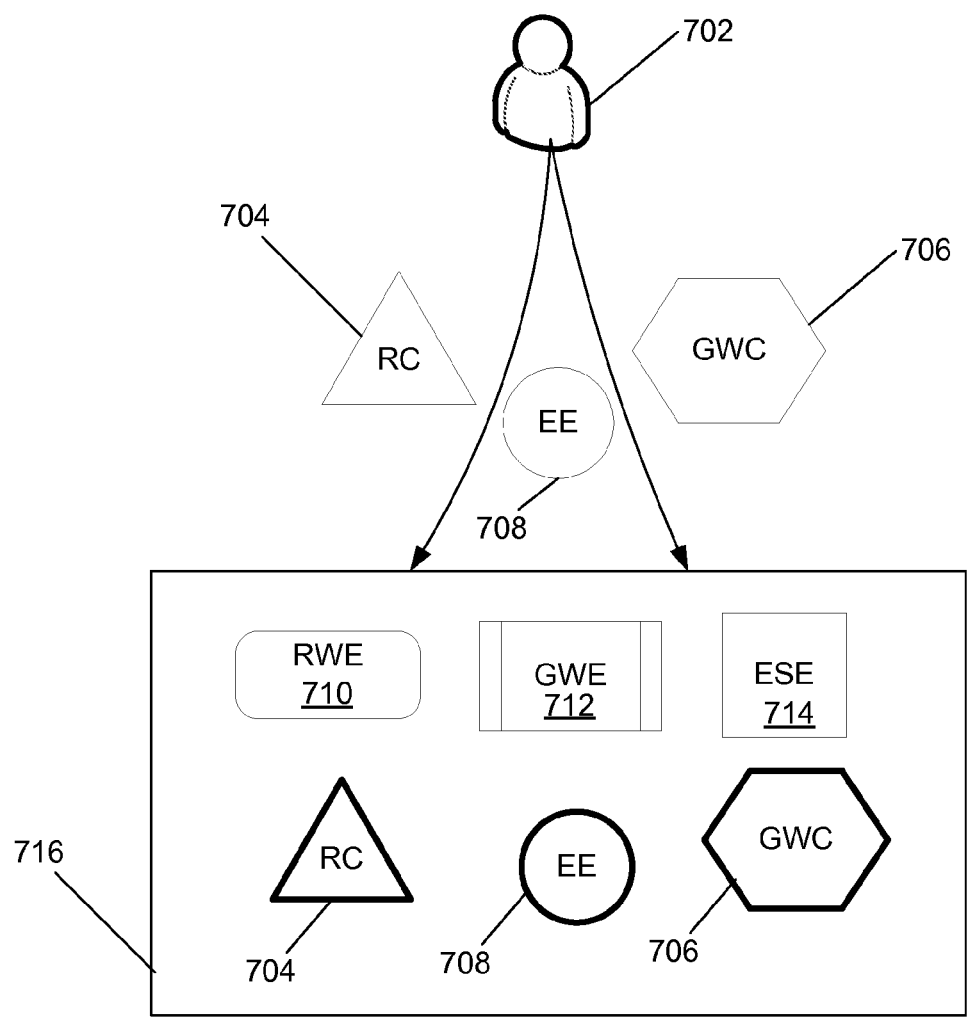
FIG. 7 illustrates a conceptual diagram of interactions between a user and a gambling hybrid game in accordance with embodiments of the invention.

In accordance with some embodiments, a player can interact with a gambling hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to Enabling Elements (EE), are utilized in a gambling hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a based gambling hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a gambling hybrid game or in a remote server.

Figure 8:
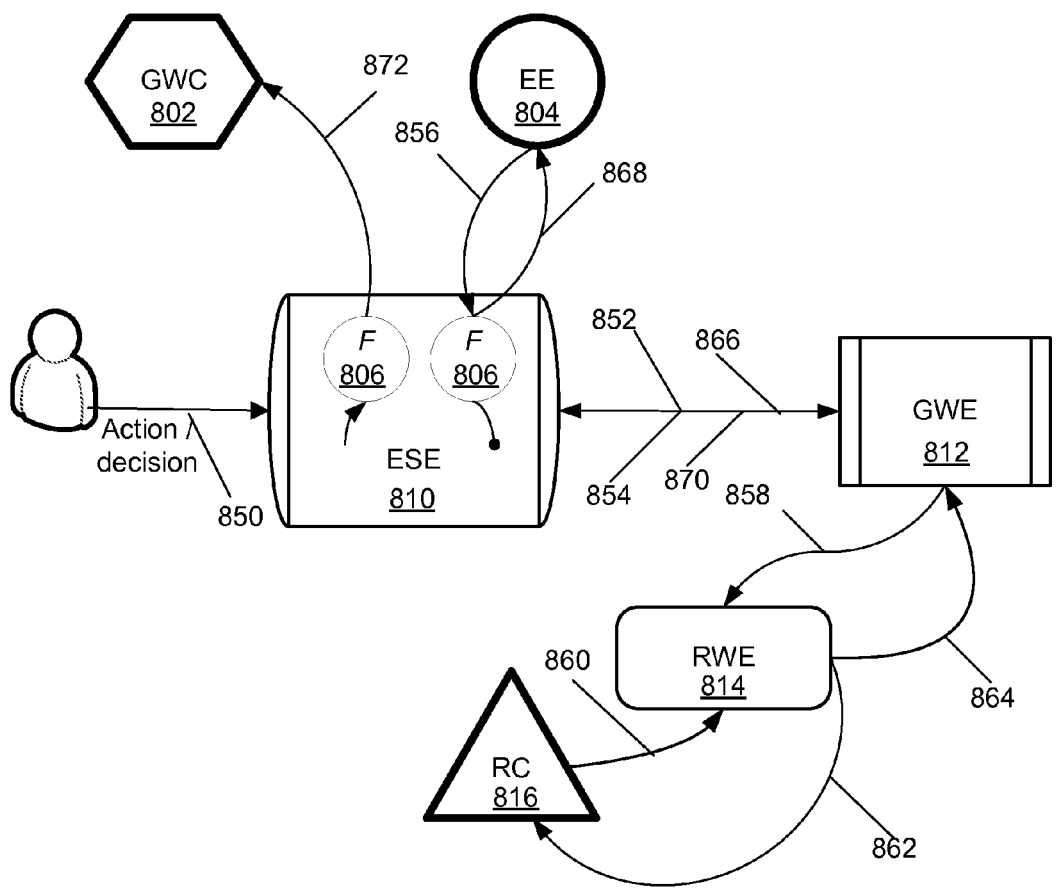
FIG. 8 illustrates a conceptual diagram of the interplay between aspects of a gambling hybrid game in accordance with some embodiments of the invention using Real World Currency (RC).

A conceptual diagram that illustrates the interplay between aspects of a gambling hybrid game in accordance with an embodiment of the invention using Real world Credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the gambling hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC 802 of the entertainment game. The ESE updates the GWC 802 using a function 806 (872).

The following is an example of the above flow in a first person shooter game, such a Call of Duty®, using a gambling hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during game play. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802)

given the success of the hit which in this example is worth 8 points, plus the 2 extra points requested by GWE 812 (872). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Figure 9:
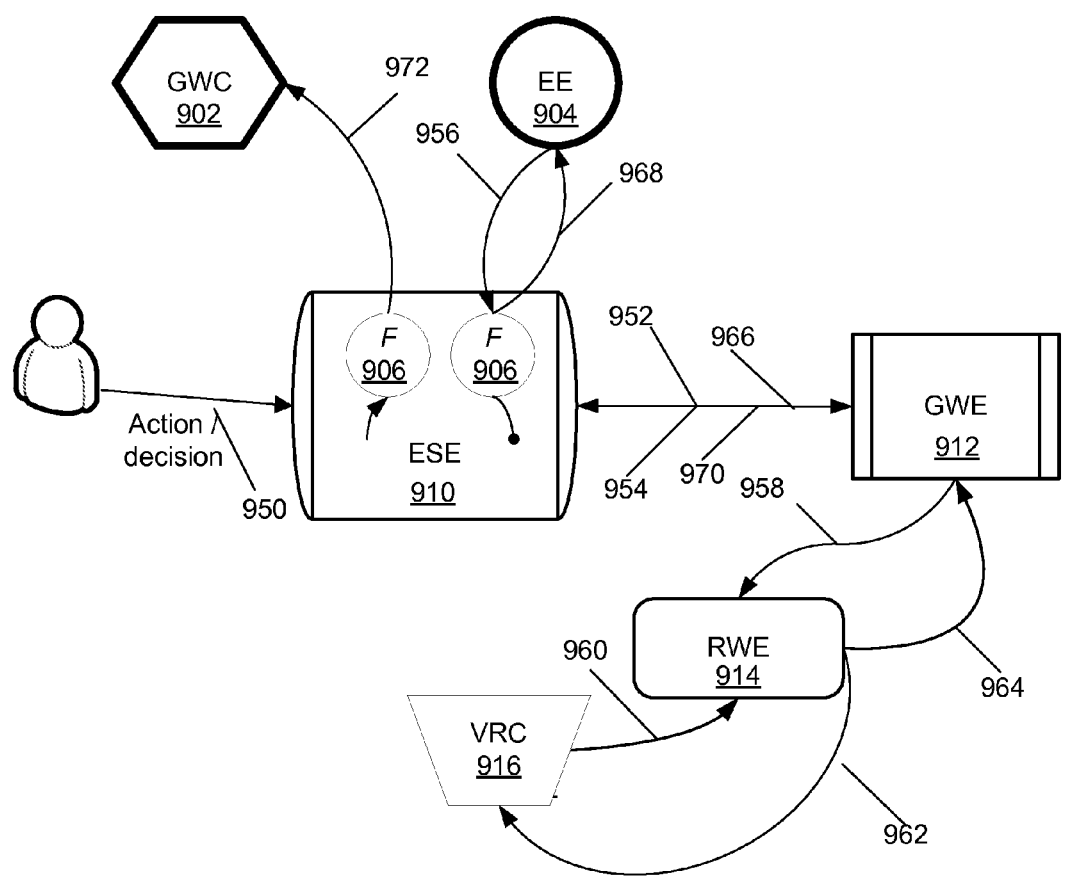
FIG. 9 illustrates a conceptual diagram of illustrates the interplay between aspects of a gambling hybrid game in accordance with other embodiments of the invention using Virtual Real World Currency (VRC).

A conceptual diagram that illustrates the interplay between aspects of a gambling hybrid game in accordance with an embodiment of the invention using virtual real world credit (VRC) is illustrated in FIG. 9. As seen in the FIG. 9, substituting VRC in place of RC is effected without impact to the architecture or operation of the gambling hybrid game. The implementation of FIG. 9 is not the only embodiment using virtual currency within a gambling hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a gambling hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the gambling hybrid game that Triax Jacks would be wagered in place of RC, such that the gambling hybrid game could be played for free, or with played with operator sponsored Triax Jacks.

Returning to the process in FIG. 9, the following may occur during use of the gambling hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Gambling Hybrid Game

Figure 10:
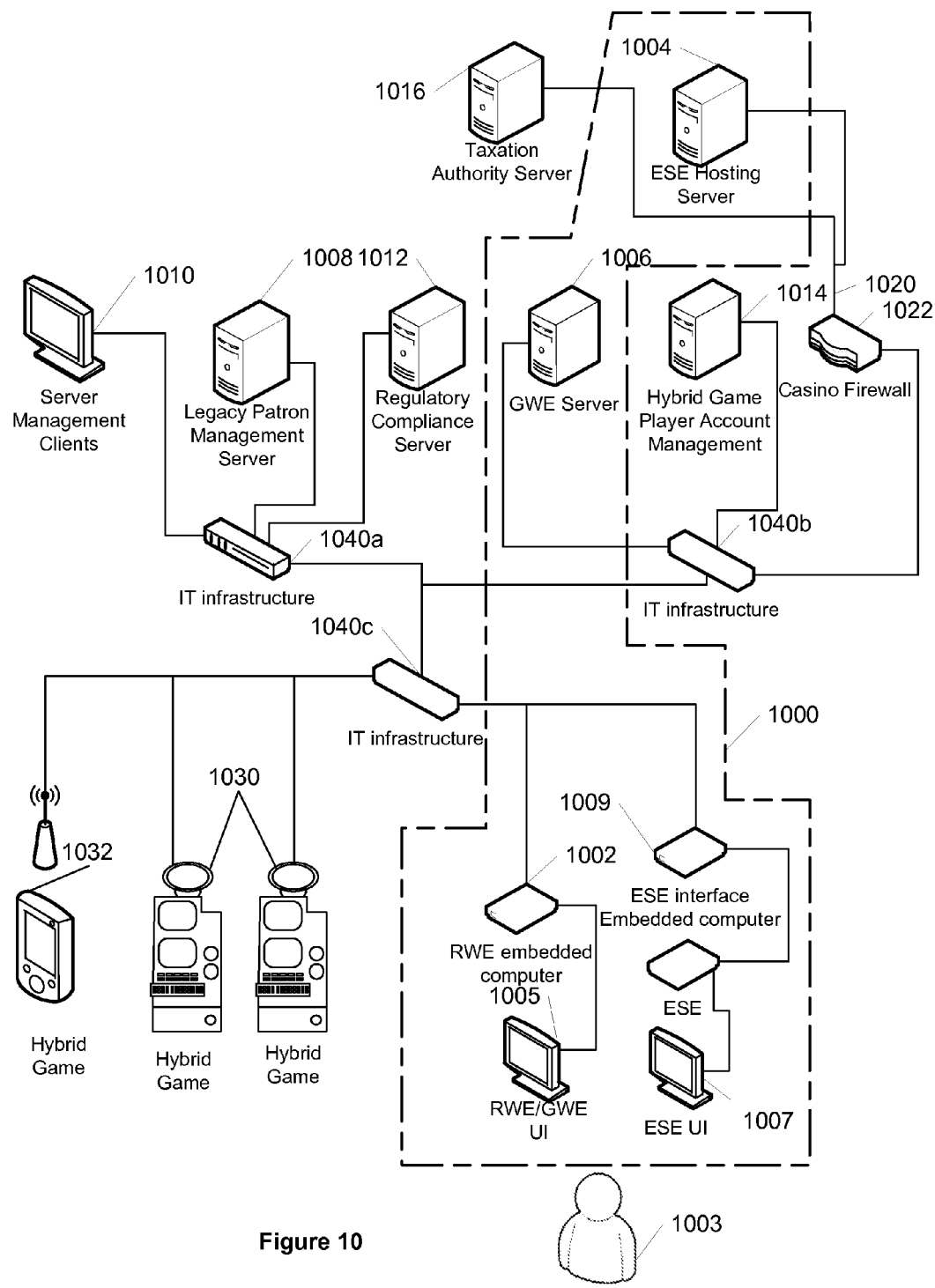
FIG. 10 illustrates a system diagram of an implementation of a network based gambling hybrid game in accordance with another embodiment of the invention.

A system diagram that illustrates an implementation of a network distributed gambling hybrid game with a GWE local server in accordance with embodiments of the invention is illustrated in FIG. 10. In the figure, the gambling hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a gambling hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to illustrate all servers and systems to which a gambling hybrid game 1000 might be inevitably be connected, and indeed one might expect there would be others, but rather provides an example of a set of a sub-set of systems which would be present in an exemplary embodiment of an installation.

Figure 11:
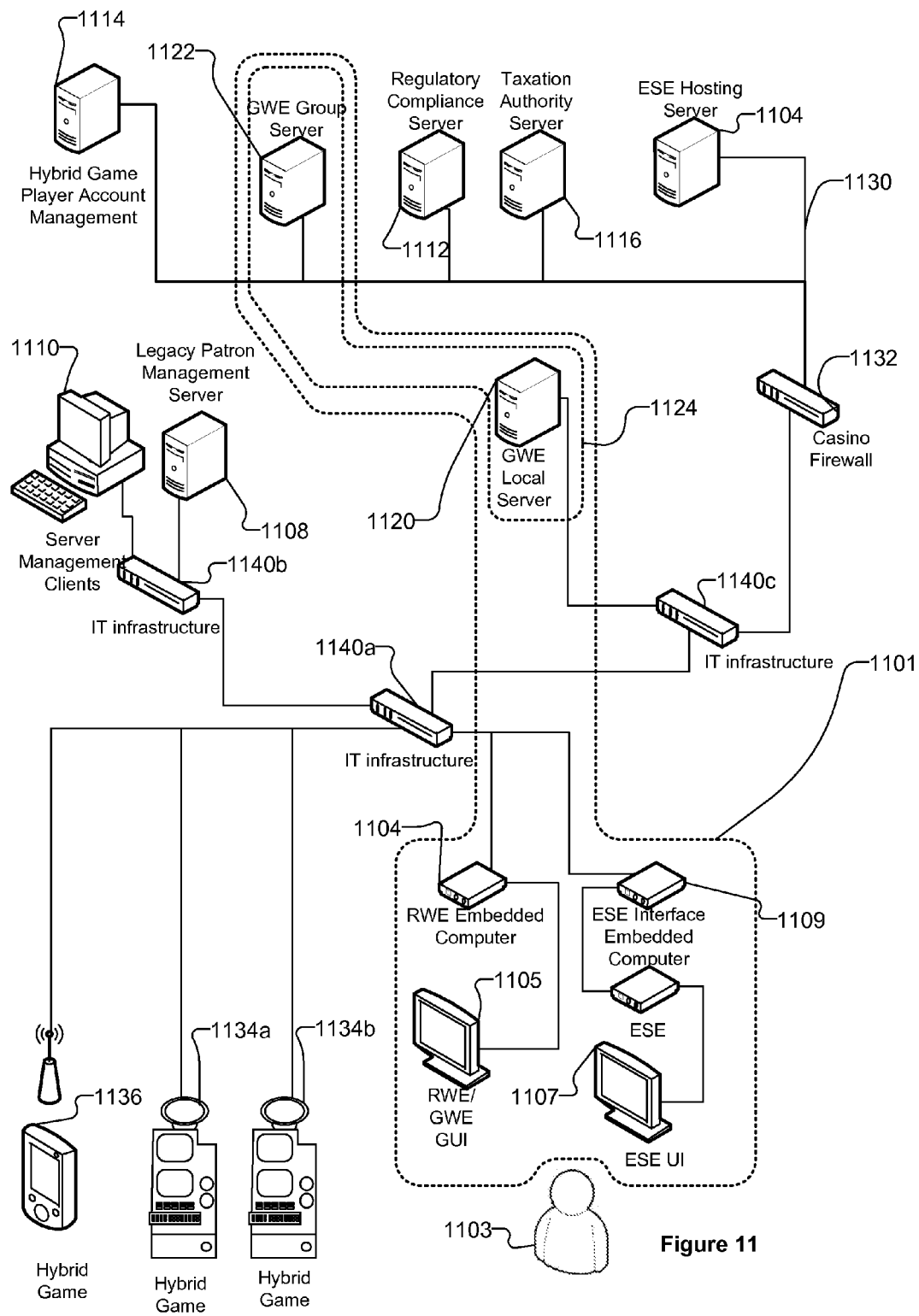
FIG. 11 illustrates a system diagram of an implementation of an Internet based gambling hybrid game in accordance with an embodiment of the invention.

FIG. 11 is a diagram showing another implementation of a gambling hybrid game in accordance with an exemplary embodiment. In the figure, the gambling hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122 (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded gambling hybrid game components via communications network such as the Internet 1130 through a firewall 1132. FIG. 11 also illustrates various other systems, which may reside outside the bounds of the casino and are connected to the framework via communications network. The end devices utilized for user interfaces for a gambling hybrid game include, but are not limited to, casino electronic game machines, 1134*a* and 1134*b,* and wireless or portable devices, such as smart phone 1136, personal digital assistants, tablet computers, video gaming consoles or the like.

These disparate devices are connected within and without the casino through the casino's information technology structure as illustrated by routers 1140*a*, 1140*b* and 1140*c*. It should be understood that FIG. 11 does not attempt to illustrate all servers and systems to which a gambling hybrid game might be inevitably be connected, and indeed one might expect there would be others, but rather provides an example of a set of a sub-set of systems which would be present in an exemplary embodiment of an installation.

Figure 12:
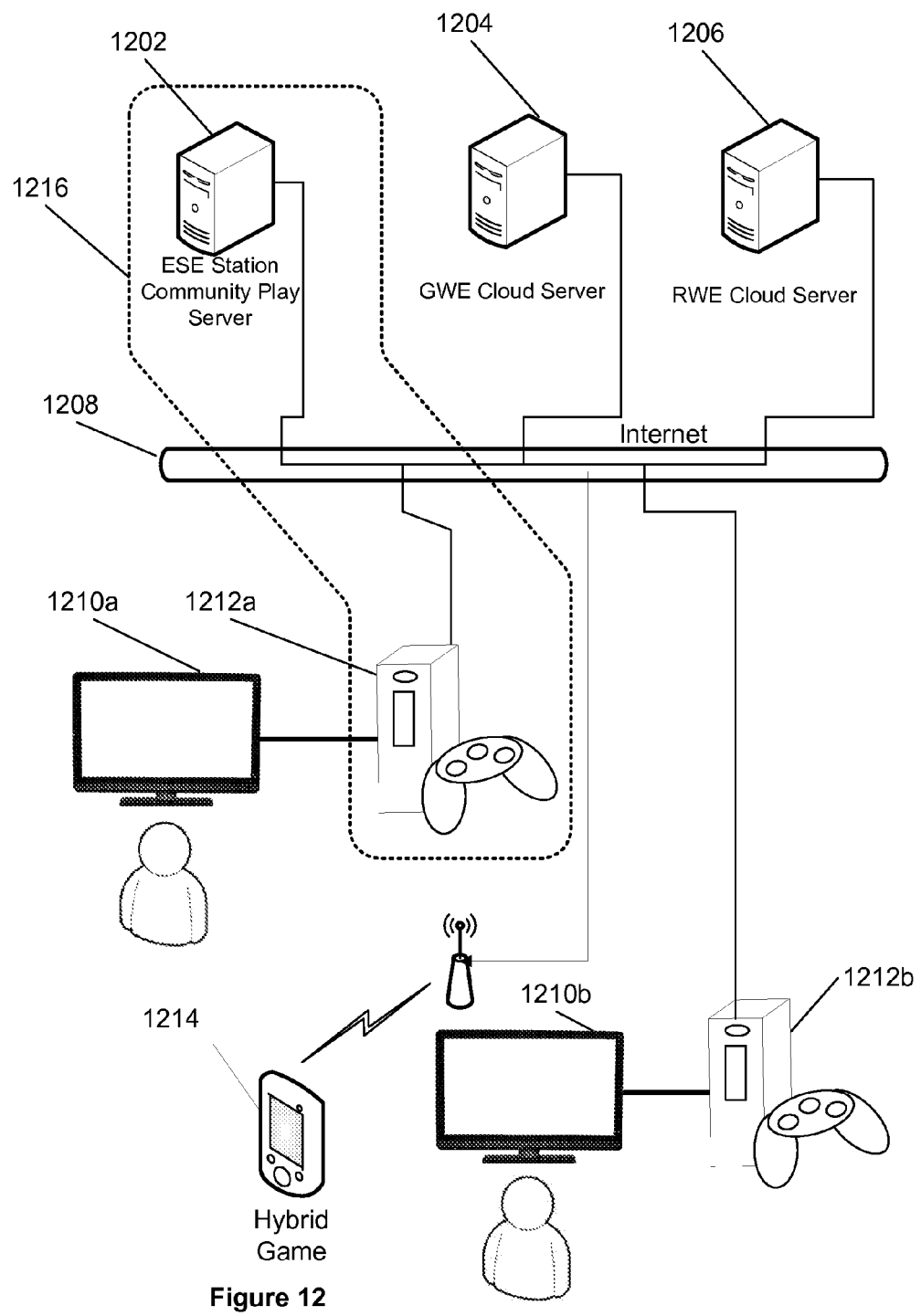
FIG. 12 illustrates a system diagram of an implementation of a cloud based gambling hybrid game in accordance with an embodiment of the invention.

A system diagram that illustrates an implementation of network a cloud based gambling hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touchscreen or PDA) of gambling hybrid games over the Internet 1208. Each gambling hybrid game includes a local ESE 1212*a* or 1212*b* (such as, but not limited to, a video game console or a gaming computer system) that interfaces with a remote ESE server 1002. Processes performed by an ESE 1212*a* or 1212*b* can be performed in multiple locations, such as, but not limited to, remotely on an ESE server 1202 and locally on a local ESE 1212*a*. In addition, a gambling hybrid game may include a Personal Digital Assistant (PDA) 1214 or other type of mobile computing device game coupled to the ESE hosting server 1202, thus providing the opportunity for a player to play a gambling hybrid game on the PDA through a mobile phone or data network.

There are many possible permutations of how a gambling hybrid game could be constructed, with FIGS. 10, 11 and 12 showing only three possible permutations and provided as examples, which are not intended to suggest limitations to the forms of the architecture. Other embodiments include a version where the entire gambling hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
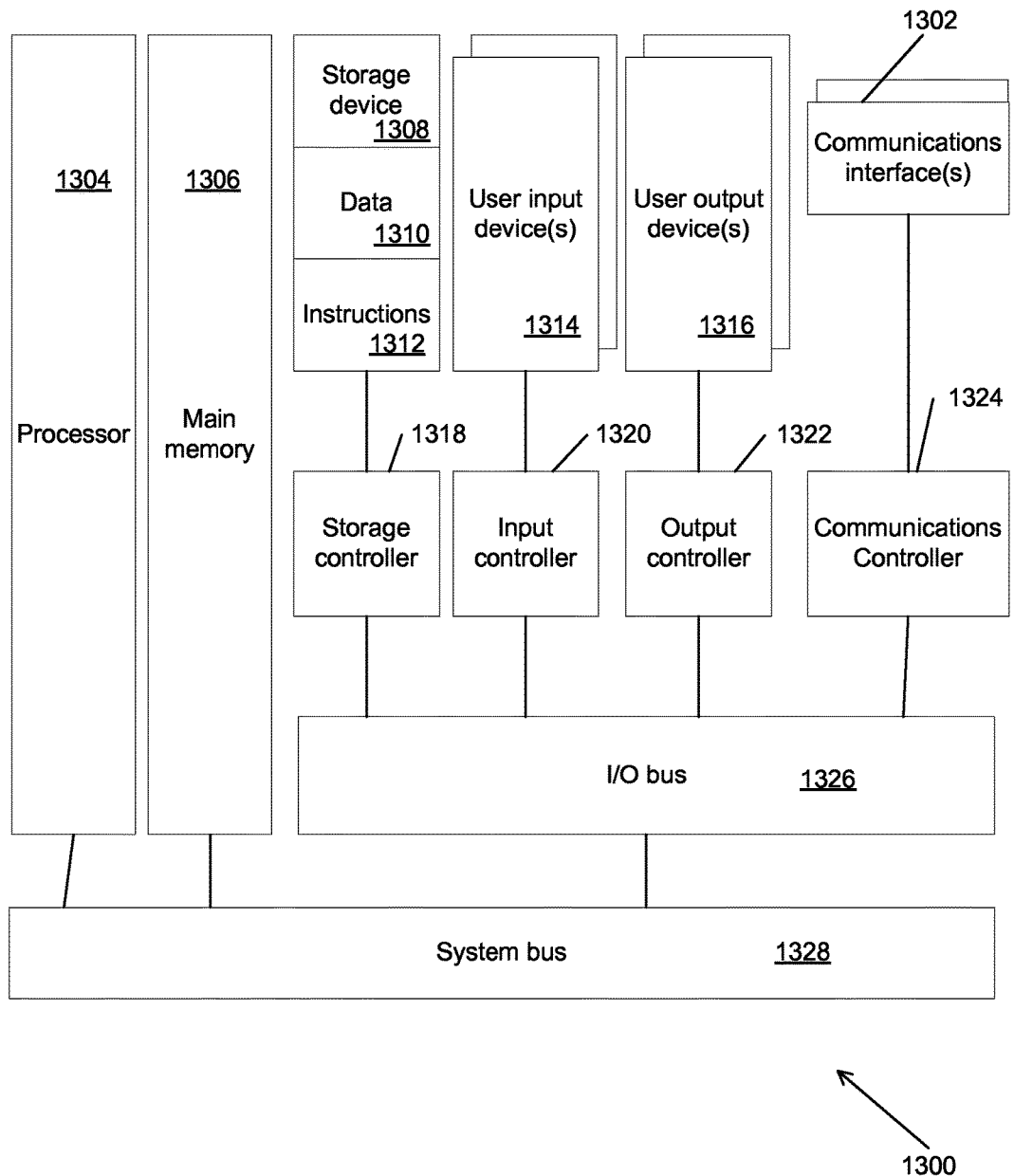
FIG. 13 illustrates a block diagram of components of a device implementing a gambling hybrid game in accordance with an embodiment of the invention.

Any of a variety of processing apparatuses can host various components of a gambling hybrid game in accordance with embodiments of the invention. In accordance with embodiments of the invention, these processing apparatuses can include, but are not limited to, mobile device such as a smartphone, personal digital assistant or the like, a wireless device such as a tablet computer or the like, an electronic gaming machine, a general purpose computer, a computing device and/or a controller. A processing apparatus that is constructed to implement a gambling hybrid game in accordance with embodiments of the invention is illustrated in FIG. 13. In the processing apparatus 1300, a processor 1304 is coupled to a memory 1306 by a bus 1328. The processor 1304 is also coupled to non-transitory processor-readable storage media, such as a storage device 1308 that stores processor-executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device 1304 into the memory 1306. The processor 1304 can also execute instructions that operate on the data to implement various aspects and features of the components of a gambling hybrid game. The processor 1304 can utilize various input and output devices in accordance with the instructions and the data in order to create and operate user interfaces for players or operators of a gambling hybrid game (such as but not limited to a casino that hosts the gambling hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

A Gambling Hybrid Game With Accumulated Trigger and Deferred Gambling

In accordance with many embodiments of the invention, the results of gambling events in a gambling game may return RC or VRC. The VRC is then utilized subsequently (within the entertainment game session/context and/or a subsequent entertainment game session/context that may or may not be for the same entertainment game) in a manner in a gambling hybrid game that affects the entertainment game portion of the gambling hybrid game, and to the extent that this in turn affects the amount of an entertainment game resource such as EE, AE, CEE, or the like to be accumulated, subsequent gambling games are also impacted.

In accordance with embodiments of this invention, the activating elements collected may be used to determine the amount of RC that may be committed to a gambling event in a gambling game with a specific singular nature, or it may also shape the nature of play of the gambling game. For example, one type of EE that is collected may relate to enabling a low-risk, low-reward gambling game, while another type of EE may relate to enabling a very high-risk, high reward game. Each type of EE (and/or AE, CEE, and the like as is present in the entertainment game construct) may also relate to a specific amount of RC that is enabled to be gambled and/or it may enable a specific number of gambling events or gambling game plays in the gambling game (i.e. "spins of the reels"). So each of these activating elements (i.e. AE, CEE, EE, and the like) can effectively perform one or more of the following functions: characterize the gambling game, set the amount (as a maximum amount or a specific amount of RC or VRC that may be wagered on an outcome of a gambling event) to be gambled, set the number of times that a gambling event in the gambling game can transpire. These activating elements can either be localized to a specific entertainment game session, entertainment game title, entertainment game operator; or can extend across more than one of these domains in accordance with embodiments of this invention. Furthermore, the activating elements can persist indefinitely or only for a limited period of time as well in accordance with some embodiments. Still further, participation in the gambling game by the may be optional and not required.

In accordance with some embodiments of the invention, a pay table used to determine results of a gambling event in a gambling game can be affected by the activating elements. The pay table can be affected not just by the character of a specific activating element, but the amount of the activating element accumulated, or the rate of their accumulation. The amount or rate of accumulation can be measured across one or more activating element types in a given entertainment game. The accumulation can be measured over a specific time period of real time and/or game time within a given entertainment game session or across more than one entertainment game session. In accordance with several embodiments where cooperative play is involved (which may or may not directly involve CEE), the play table or pay tables affecting more than one player may be determined as a result of the amount of the activating element(s) accumulated by a single player and/or multiple players.

In accordance with a number of embodiments of the invention, one or more gambling games are actuated as a function of the amount of an activating element such as, but not limited to, EE, AE, and CE accumulated and possibly the amount of RC committed to the gambling game by the player. This actuation may take place automatically. For example, the actuation of the gambling game(s) may take place at a prescribed point in the entertainment game including, but not limited to, the end of the game, in accordance with a prescribing condition set by the player including, but not limited to, a maximum amount to wager on the outcome of a gambling event and/or maximum amounts won or lost from wager on the outcome of gambling events in the gambling game. During these gambling opportunities the player can undertake take one or more gambling events in a gambling game or one or more gambling games as enabled by the activating elements that the player has accumulated over a specific time period or up to that point in the entertainment game. The player can inform the gambling hybrid game when the gambling game is completed and the gambling hybrid game can return to the play of the entertainment game and the accumulation of activating elements.

In accordance with a number of embodiments of the invention, activating elements may be accumulated and/or lost during game play of the entertainment game (prior to participating in a gambling game). The loss of an activating element may take place through a variety of mechanisms in the entertainment game. For example, the loss of points in health status of a player character may cause a character to lose activating elements, such as coins, because the character does not have the strength to carry all of the accumulated coins in accordance with some embodiments. In another embodiment, the destruction of a spaceship (loss one of a player's lives in the entertainment game) may cause the loss of all activating elements accumulated to that point or at least a portion of the accumulated activating elements.

In accordance with some embodiments of this invention, the player may manually trigger a gambling event of a gambling game at any time during the game play of the entertainment game play presuming that the necessary activating elements and RC are available to enable the gambling game. The play of the gambling game may take place concurrently with the play of the entertainment game (i.e. the game play of the entertainment game does not need to be explicitly paused).

The following is a description of an example of a gambling hybrid game with an accumulated triggering element and delayed gambling in accordance with an embodiment of this invention. In accordance with this embodiment, the gambling hybrid game provides 'JET PACK JOY RIDE'® as the entertainment game and a gambling game. During play of 'JET PACK JOY RIDE'®, the player accumulates gold coins. Each gold coin represents a predetermined amount of RC, for example $0.10. When the player dies, the player is presented with the opportunity to gamble an amount equal to the predetermined amount of RC multiplied by the accumulated number of gold coins across one or a series of gambling games (i.e. the player can gamble a subset of the number of coins over more than one gambling game or over more than one event in a particular gambling game.) assuming the player has adequate RC.

In accordance with some embodiments of this invention, each gambling event in a gambling game will provide a result of a wager on the outcome of the gambling event in RC and Quanta. For purposes of this discussion, Quanta is a type currency that may be converted into in-game objects, to special features, to provide access to special gambling games, to shape the gambling games and to provide other features and/or objects in either the entertainment and/or gambling game. Quanta may only be associated with and usable in the entertainment game currently being provided by the gambling hybrid game or may be associated with and usable across a group of associated entertainment games.

In accordance with some embodiments, the activating elements and the quanta can be resident in the same in-game object being contextually defined. For example, when gold coins (the activating element) are collected, the coins may be used to enable or shape a gambling game. When the results of wagers on gambling events in the gambling game are returned as Quanta, the Quanta may be used to buy in-game objects. In accordance with some embodiments, the activating element and Quanta may be co-resident meaning the player may use the activating elements as Quanta without activating a gambling game that consumes the Quanta. One example of the activating element and the Quanta being co-resident in accordance with embodiments of this invention is a gambling hybrid game in which the entertainment game is the 'JET PACK JOY RIDE'® game in which the gold coins collected during the play of 'JET PACK JOY RIDE'® can be used either to acquire in-game objects without gambling; or to enable a gambling game that returns gold coins that may in turn be used to acquire in-game objects and the like.

Another example of a gambling hybrid game with an accumulated triggering element and delayed gambling in accordance with an embodiment of this invention is a gambling hybrid game that provides a World War II era aerial combat game as the entertainment game. During game play of the aerial combat game, each "kill" that the player achieves enables a single gambling event in a gambling game. In a number of embodiments, the gambling event in the gambling game does not occur in response to the "kill" in the entertainment game. The gambling event is delayed until a predetermined event in the entertainment game or until a predetermined amount of activating elements have been accumulated. In accordance with an embodiment, a "kill" of an enemy fighter enables a $10 bet on the outcome of a gambling event in gambling game A and a "kill" of an enemy bomber enables a $50 bet on the outcome of a single gambling event in gambling game B. In some embodiments, gambling games A and B are the same gambling game and the only the amount commit to the bet is changed by the type "kill" achieved by the player. The results of the gambling event in the particular gambling game return a monetary award or RWC value; and a VRC award. The VRC may be game money or experience points that may be used to improve the player's aircraft by providing improved characteristics including, but not limited to, improved maneuverability, improved airspeed, more accurate machine guns, an ability to absorb more damage, and improved fuel efficiency.

Figure 14:
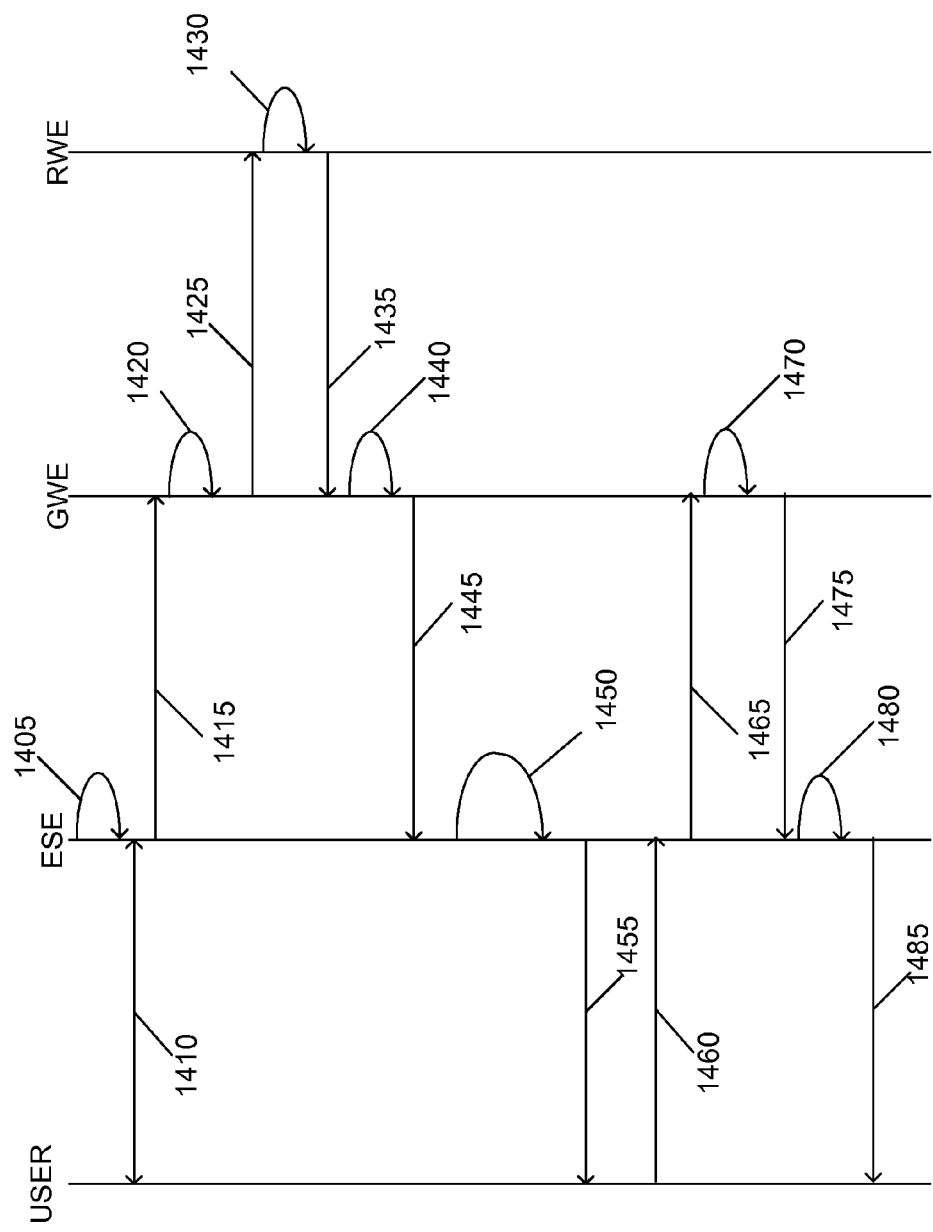
FIG. 14 illustrates a timing diagram of information passed between components of a gambling hybrid game that provides delayed gambling with an accumulated trigger in accordance with embodiments of the invention.

System For Providing A Gambling Hybrid Game With Accumulated Trigger Element and Deferred Gambling A system that provides a gambling hybrid game with an accumulated trigger with deferred gambling, as described above, in accordance with embodiments of this invention is shown in FIGS. 14-17. A timing diagram of the information passed between various components of a gambling hybrid game to provide deferred gambling based on an accumulated trigger element in accordance with an embodiment of the invention is shown in FIG. 14. The process begins when the ESE performs the processes to provide an entertainment game (1405) and interacts with the player while providing the entertainment game (1410). This includes tracking the accumulation of an activating element and other game characteristics including, but not limited to, AE, CC CE, EE CEE, REE, and RGO. Based upon progression of the entertainment game, the ESE generates and provides a status update of entertainment game information including an update of the accumulation of the activating element during a specific period of entertainment game play to the GWE (1415).

The GWE receives the update and determines whether the player has accumulated a sufficient amount of the activating element and/or the game play has reached a sufficient point during the specific period to enable a gambling game (1420). The GWE may perform certain algorithms based upon the updates to determine a metric, such as the rate of accumulation of the activating element in order to determine whether a gambling game should be provided in accordance with some embodiments. In accordance with some embodiments, the type of gambling game may also be determined by the GWE based upon the accumulation of one or more activating elements. The pay tables for the selected gambling game may also be determined based upon the accumulation of one of more activating elements in accordance with some embodiments.

When the GWE determines a gambling game and the type of gambling game to be provided based on the accumulation of one or more activating elements, the GWE provides a request (1425) for a gambling event for the gambling game to the RWE. The request may specify the type of gambling game for the requested event and/or the pay tables to use to determine the results of the gambling event and/or any wagers based upon the outcome of the gambling event. The RWE then determines the result of the gambling event (1430). This may include the updating of a player account for RWC that was won or lost from a wager on the outcome as well as the result to provide to the GWE. The result of the gambling event is then provided by the RWE to GWE (1435).

The GWE receives the results and determines the amount of Quanta that the user received based upon the outcome of the gambling event (1440). The GWE may also update the Quanta in a player's account based on the determined amount in accordance with some embodiments of this invention. The GWE generates update information for the entertainment game that provides information pertaining to the results of the gambling event and the change in Quanta that occur based on the result of the gambling event. The update information is then provided by the GWE to the ESE (1435). The ESE updates the entertainment game information including the new amount of Quanta available (1450) and provides to update entertainment game to the user (1455). The updated entertainment game may include information about game characteristics that may be changed using the Quanta available.

The ESE receives a request from the user to change an entertainment game characteristic using the Quanta (1460). The request is then provided by the ESE to the GWE (1465). The GWE makes the appropriate changes to the entertainment game characteristics and Quanta; and generates an update of the entertainment game characteristics including the changes to the Quanta available to the user (1470). The GWE then provides the update of the ESE (1475). The ESE uses the update to update the entertainment game characteristics (1480) and provide the entertainment game to the user (1480).

Although a specific process performed by the gambling hybrid system to provide an accumulated trigger with delayed gambling is described above with respect to FIG. 14, any of a variety of processes may be utilized in accordance with embodiments of the invention. Additional processes for providing an accumulated trigger with delay gambling for a gambling hybrid game in accordance with embodiments of the invention are discussed further below.

Figure 15:
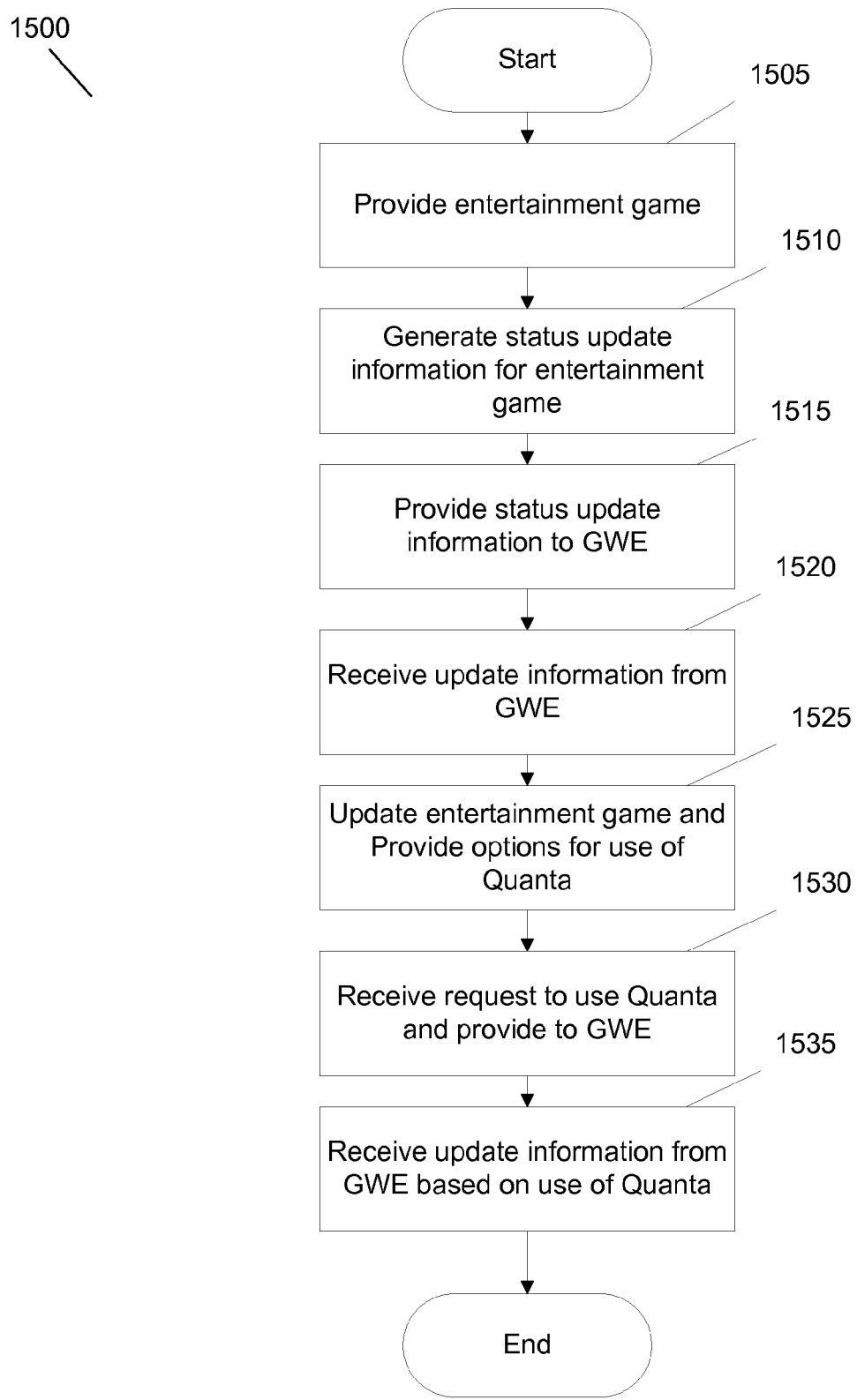
FIG. 15 illustrates a flow diagram of a process performed by an Entertainment System Engine to generate a gambling hybrid game that provides delayed gambling with an accumulated trigger in accordance with embodiments of the invention.

A process performed by an ESE for providing an entertainment game in accordance with an embodiment of the invention is shown in FIG. 15. In process 1500, the ESE provides the entertainment game to a player (1505). After a specific period of time in the entertainment game, the ESE generates status update information for the specific period of time (1510). The specific period of time may be a specific period of real time, a specific period of game time, or a specific amount of progression in the entertainment game, or any other metric that measures progression of entertainment game play by the player. The status update information includes the accumulation of one or more activating element(s) during the specific period. The status update information may also include other game characteristics including, but not limited to, AE, CC CE, EE CEE, REE, and RGO in accordance with embodiments of this invention. The status update information is provided to the GWE by the ESE (1515). The ESE then receives update information from the GWE (1520) and the ESE updates the entertainment game accordingly (1525).

In accordance with many embodiments of this invention, the update received from the GWE includes information relating to the amount of Quanta received based on the results of gambling events in one or more gambling games provided based upon the activating elements. Furthermore, the update may include information relating to the use of the Quanta to modify one or more entertainment game characteristics.

The ESE receives an input indicating that user would like to use the VRC available to modify an entertainment game characteristic (1530). The ESE receives the request and provides the request to the GWE. The GWE make the appropriate adjustments and provides an update to the ESE with the updates (1535). The ESE uses the updates to modify the entertainment game being provided and the process ends.

Although a specific process performed by the ESE to provide the accumulated trigger and delayed gambling in a gambling hybrid game is illustrated in FIG. 15, any of a variety of processes can be utilized in accordance with embodiments of the invention.

Figure 16:
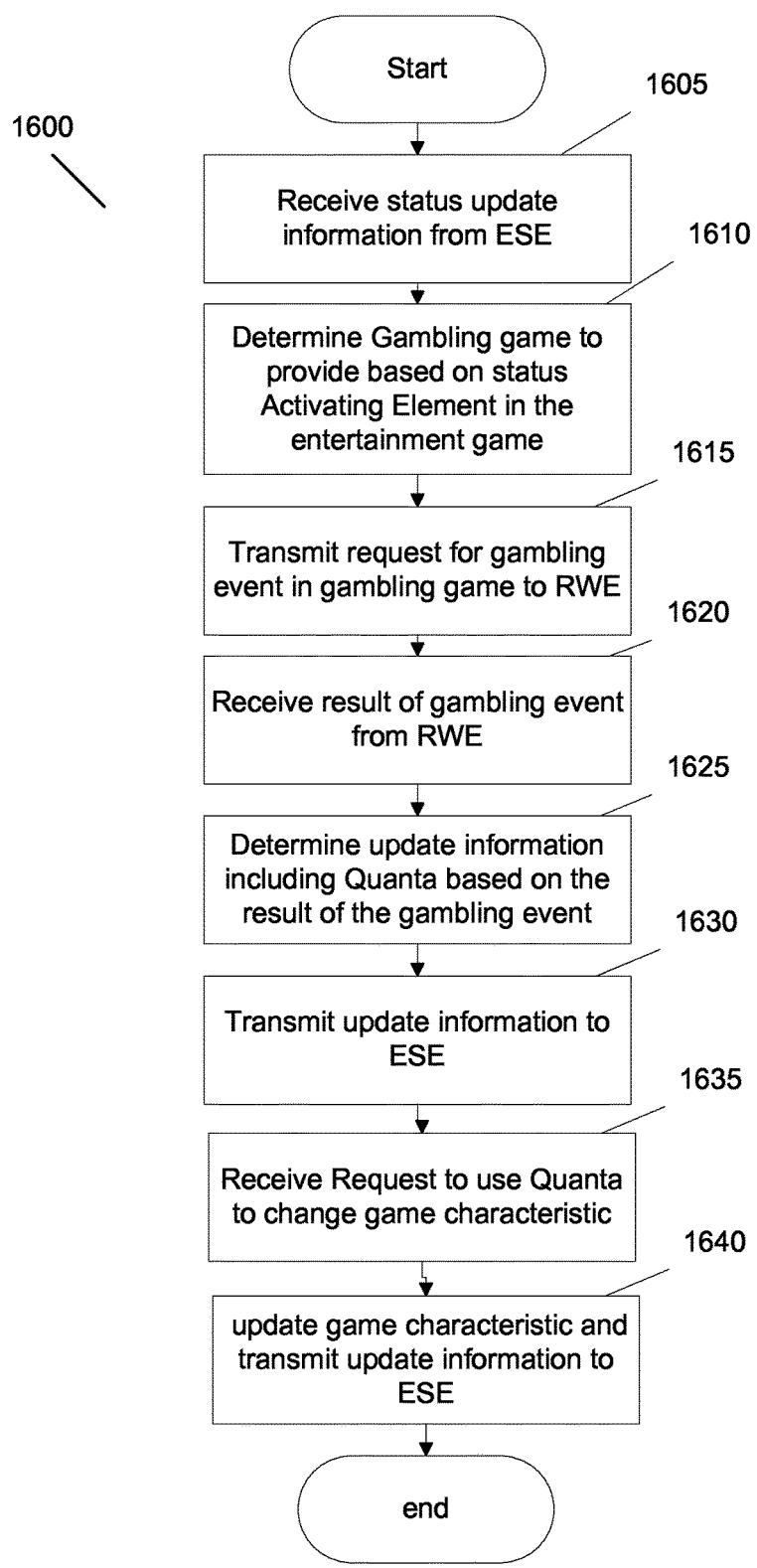
FIG. 16 illustrates a flow diagram of a process performed by a Game World Engine to generate a gambling hybrid game that provides delayed gambling with an accumulated trigger in accordance with embodiments of the invention.

A process determining when a gambling event in a gambling game is to be provided based upon accumulated activating elements performed by a GWE in accordance with an embodiment of the invention is shown in FIG. 16. In process 1600, the GWE receives a status update from the ESE (1605). The status update includes information about the accumulation of one or more activating elements during the a specific period time. The GWE then determines a gambling game is to be provided based on the accumulation of activating elements during the specific period of time (1610). The determination may include performing computations to determine a metric for one or more activating elements such as, but not limited to, determining the rate of accumulation of the activating element and determining the total accumulation of an activating element over the total time of entertainment game play. Furthermore, as described above, the determination may also include a particular one of multiple gambling games to provide and determining the appropriate pay table(s) to use in the provided gambling game. GWE also may determine an amount to wager on an outcome of a gambling event in the gambling game based on the accumulation of activating elements in some embodiments.

The GWE provides a request to the RWE to provide a gambling event for the determined gambling game (1615). The request may include the particular gambling game to provide, amount of RWC to wager on the outcome of a gambling event, and the pay table(s) to use to provide results for the RWC wager and/or the Quanta to award based upon the outcome of the gambling event in accordance with some embodiments of this invention. The GWE then receives the results of the gambling event from the RWC (1620). The results provided to the GWE may also include RNG results and other information. The results of the gambling events are used by the GWE to determine the Quanta awarded to the player and/or the current amount of Quanta available upon the result of the gambling event (1625). The GWE then generates an update for the ESE and provides the update to the ESE (1630). The update may include the amount of Quanta available to the player and the options of entertainment game characteristics that may be changed through the expenditure of Quanta. The GWE receives a request to use Quanta available to the player to change an entertainment game characteristic by expending some or all of the Quanta available to the player (1635). The GWE update the Quanta available to the player and the change to the entertainment game characteristic; and provides update information the ESE about the change to the entertainment game characteristic for use in the entertainment game (1640).

Although a specific process performed by the GWE to provide the accumulated trigger and delayed gambling in a gambling hybrid game is illustrated in FIG. 16, any of a variety of processes can be utilized in accordance with embodiments of the invention.

Figure 17:
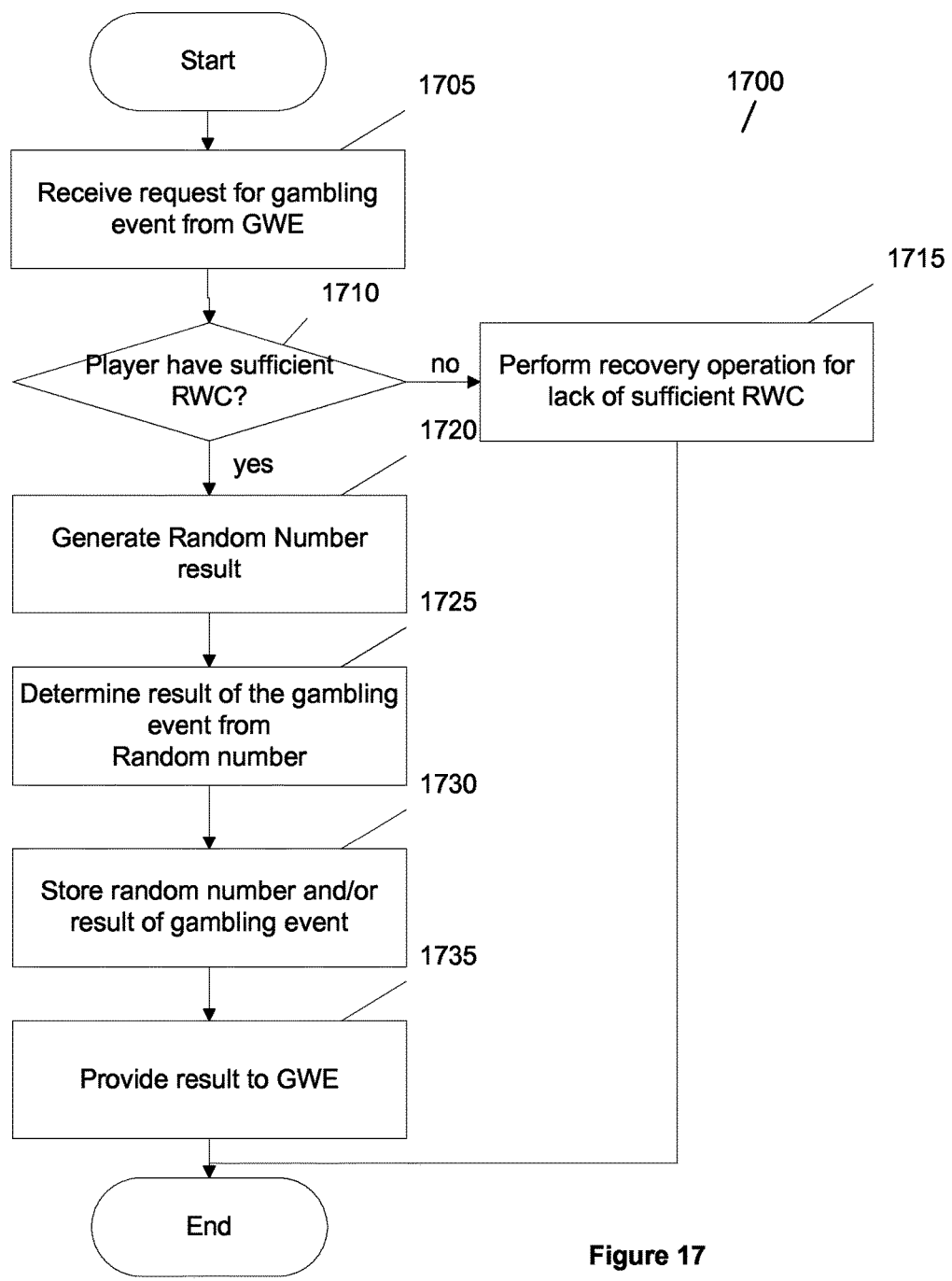
FIG. 17 illustrates a flow diagram of a process performed by Real World Engine to generate a gambling hybrid game display that provides delayed gambling with an accumulated trigger in accordance with embodiments of the invention.

A process performed by the RWE to determine the results of a gambling event in a gambling game and provide the results to the GWE in accordance with embodiments of this invention is shown in FIG. 17. In process 1700, the RWE receives a request to determine the results of a gambling event in a gambling game from the GWE (1705). The request may include the particular gambling game to provide, amount of RWC to wager on the proposition, and the pay table(s) to use to provide results for the RWC wager and/or Quanta to award based on the outcome of the gambling event in accordance with some embodiments of this invention. The RWE determines whether the player has sufficient RWC available to cover the wager (1710). If the player does not have sufficient RWC to cover the wager, the RWE performs a recovery operation (1715). The recovery operation may prevent the wager from occurring or may allow the player to supply the necessary RWC funds to cover the wager. If the player has sufficient RWC, the RWE generates a random number result using the proper RNG (1720). The random number result is then used to determine the results of the gambling event including determining the results of RWC wagers on the outcome of the gambling event and the amount of Quanta awarded based upon the outcome of the event (1725). In accordance with some embodiments, the RWE also performs all other appropriate operations for updating the RWC available to the player via a player account. The RWE may store the result and/or other information about the result, including the random number result, in a database for future use (1730). The RWE also provides the result of the gambling event to the GWE (1735). The result provided may include the amount of Quanta awarded to the player based upon the result or may indicate the outcome to allow the GWE to determine the Quanta to award depending on the particular embodiment.

Although a specific process performed by the RWE to provide the accumulated trigger and delayed gambling in a gambling hybrid game is illustrated in FIG. 17, any of a variety of processes can be utilized in accordance with embodiments of the invention.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that gaming system may be practiced otherwise than as specifically described. Thus, the foregoing description of the gaming system should be considered in all respects as illustrative and not restrictive, the scope of the claims to be determined as supported by this disclosure and the claims' equivalents, rather than the foregoing description.

What is claimed is:

1. A gambling hybrid game system that provides delayed gambling based upon an accumulated trigger in an entertainment game, comprising:
a controller constructed to execute the entertainment game and present the entertainment game to a player wherein the controller is constructed to:
maintain a record of an amount of an activating element accumulated during play of the entertainment game, and
generate a status update regarding play of the entertainment game over a specific period wherein the status update includes information about the amount of the activating element accumulated over the specific period;
communicate, to a game world server, the status update regarding play of the entertainment game over the specific period wherein the status update includes information about the amount of the activating element accumulated over the specific period;
receive, from the game world server, a result of a gambling event;
present the result of the gambling event to the player;
a real world server constructed to:
receive, from the game world server, instructions to execute the gambling event based on the status update upon the amount of the activating element accumulated over the specific period;
determine the result of the gambling event in a gambling game and to resolve a wager of credits on an outcome of the gambling event;
communicate, to the game world server, the result of the gambling event; and
the game world server, connected to the controller via a controller and connected to the real world server via a communication link, constructed to:
manage the entertainment game executed by the controller;
receive, from the controller, the status update about the entertainment game that includes the amount of the activating element accumulated over the specific period;
determine a gambling event in the gambling game is to occur based upon the amount of the activating element accumulated over the specific period;
communicate, to the real world server, instructions to execute the gambling event based on a determination of whether to execute the gambling event based upon the amount of the activating element accumulated over the specific period;
receive, from the real world server, the result of the gambling event;
communicate, to the controller, the result of the gambling event.

2. The gambling hybrid game system of claim 1 wherein the game world server is constructed further to:
determine an amount of Quanta available to the player based on the result of the gambling event wherein Quanta is a currency that may be exchanged to change an entertainment game characteristic.

3. The gambling hybrid game system of claim 2 wherein the game world server is further constructed to:
provide the entertainment game characteristic that the player may change by expending a particular amount of the Quanta;
receive a request from the player to change the entertainment game characteristic;
deduct the particular amount of Quanta from the amount available to the player; and
provide update information to the controller including the change in the game characteristic for use in the entertainment game.

4. The gambling hybrid game system of claim 1 wherein the game world server is constructed to determine a pay table for the gambling game based on a total accumulation of activating elements during game play and provide the pay table to the real world server for use in determining the results of the gambling event.

5. The gambling hybrid game system of claim 1 wherein the game world server is constructed to determine the amount of real world credit to be wagered on the gambling event in the gambling game based on an accumulation of activating elements during the specific period and provide the wager amount to the real world server.

6. The gambling hybrid game system of claim 1 wherein the game world server is further constructed to:
select one of plurality of gambling games to be used for the gambling event based upon the activating elements accumulated; and
indicate to the real world server that the selected gambling game is to be used for the gambling event.

7. The gambling hybrid game of claim 1, wherein the communications link is the communications network.

8. A gambling hybrid game system that provides delayed gambling based upon an accumulated trigger in an entertainment game, comprising:
a controller constructed to execute the entertainment game and present the entertainment game to a player wherein the controller is constructed to:
maintain a record of an amount of an activating element accumulated during play of the entertainment game, and
generate a status update regarding play of the entertainment game over a specific period wherein the status update includes information about the amount of the activating element accumulated over the specific period;
communicate, to a game world server, the status update regarding play of the entertainment game over the specific period wherein the status update includes information about the amount of the activating element accumulated over the specific period;
receive, from the game world server, a result of a gambling event;
present the result of a gambling event to the player;
the game world server, connected to the controller via a controller and connected to a real world server via a communication link, constructed to:
manage the entertainment game executed by the controller;
receive, from the controller, the status update about the entertainment game that includes the amount of the activating element accumulated over the specific period;
determine the gambling event in a gambling game is to occur based upon the amount of the activating element accumulated over the specific period;
communicate, to the real world server, instructions to execute the gambling event based on a determination of whether to execute the gambling event based upon the amount of the activating element accumulated over the specific period;
receive, from the real world server, the result of the gambling event;

communicate, to the controller, the result of the gambling event.

9. The gambling hybrid game system of claim 8, wherein the game world server is constructed further to:
determine an amount of Quanta available to the player based on the result of the gambling event wherein Quanta is a currency that may be exchanged to change an entertainment game characteristic.

10. The gambling hybrid game system of claim 9, wherein the game world server is further constructed to:
provide the entertainment game characteristic that the player may change by expending a particular amount of the Quanta;
receive a request from the player to change the entertainment game characteristic;
deduct the particular amount of Quanta from the amount available to the player; and
provide update information to the controller including the change in the game characteristic for use in the entertainment game.

11. The gambling hybrid game system of claim 8, wherein the game world server is constructed to determine a pay table for the gambling game based on a total accumulation of activating elements during game play and provide the pay table to the real world server for use in determining the results of the gambling event.

12. The gambling hybrid game system of claim 8, wherein the game world server is constructed to determine the amount of real world credit to be wagered on the gambling event in the gambling game based on an accumulation of activating elements during the specific period and provide a wager amount to the real world server.

13. The gambling hybrid game system of claim 8, wherein the game world server is further constructed to:
select one of plurality of gambling games to be used for the gambling event based upon the activating elements accumulated; and
indicate to the real world server that the selected gambling game is to be used for the gambling event.

14. The gambling hybrid game of claim 8, wherein the communications link is the communications network.

15. A gambling hybrid game system that provides delayed gambling based upon an accumulated trigger in an entertainment game, comprising:
a real world server constructed to:
receive, from a game world server, instructions to execute a gambling event based on a status update upon an amount of an activating element accumulated over a specific period;
determine a result of the gambling event in a gambling game and to resolve a wager of credits on an outcome of the gambling event;
communicate, to the game world server, the result of the gambling event; and
the game world server, connected to the controller via a controller and connected to the real world server via a communication link, constructed to:
manage the entertainment game executed by the controller;
receive, from the controller, the status update about the entertainment game that includes the amount of the activating element accumulated over the specific period;
determine the gambling event in the gambling game is to occur based upon the amount of the activating element accumulated over the specific period;
communicate, to the real world server, instructions to execute the gambling event based on a determination of whether to execute the gambling event based upon the amount of the activating element accumulated over the specific period;
receive, from the real world server, the result of the gambling event;
communicate, to the controller, the result of the gambling event.

16. The gambling hybrid game system of claim 15, wherein the game world server is constructed further to:
determine an amount of Quanta available to a player based on the result of the gambling event wherein Quanta is a currency that may be exchanged to change an entertainment game characteristic.

17. The gambling hybrid game system of claim 16, wherein the game world server is further constructed to:
provide the entertainment game characteristic that a player may change by expending a particular amount of the Quanta;
receive a request from the player to change the entertainment game characteristic;
deduct the particular amount of Quanta from the amount available to the player; and
provide update information to the controller including the change in the game characteristic for use in the entertainment game.

18. The gambling hybrid game system of claim 15, wherein the game world server is constructed to determine a pay table for the gambling game based on a total accumulation of activating elements during game play and provide the pay table to the real world server for use in determining the results of the gambling event.

19. The gambling hybrid game system of claim 15, wherein the game world server is constructed to determine the amount of real world credit to be wagered on the gambling event in the gambling game based on an accumulation of activating elements during the specific period and provide the wager amount to the real world server.

20. The gambling hybrid game system of claim 15, wherein the game world server is further constructed to:
select one of plurality of gambling games to be used for the gambling event based upon the activating elements accumulated; and
indicate to the real world server that the selected gambling game is to be used for the gambling event.

21. The gambling hybrid game of claim 15, wherein the communications link is the communications network.

* * * * *